US012740628B2

(12) United States Patent
De Castro Turner et al.

(10) Patent No.: US 12,740,628 B2
(45) Date of Patent: Sep. 22, 2026

(54) BAG OUTER PANEL ELEMENT FOR THE EXTERNAL DISPLAY OF CONTROLLABLY SELECTABLE IMAGES

(71) Applicant: Seamless Digital Limited, Northamptonshire (GB)

(72) Inventors: Robert Rodrigues De Castro Turner, Northamptonshire (GB); Mark Anthony Castro Turner, Northamptonshire (GB)

(73) Assignee: Seamless Digital Limited, Northamptonshire (GB)

(*) Notice: Subject to any disclaimer, the term of this patent is extended or adjusted under 35 U.S.C. 154(b) by 128 days.

(21) Appl. No.: 18/705,006

(22) PCT Filed: Oct. 27, 2022

(86) PCT No.: PCT/GB2022/052738
§ 371 (c)(1),
(2) Date: Apr. 26, 2024

(87) PCT Pub. No.: WO2023/073375
PCT Pub. Date: May 4, 2023

(65) Prior Publication Data

US 2025/0268353 A1 Aug. 28, 2025

(30) Foreign Application Priority Data

Oct. 28, 2021 (GB) ...................................... 2115504
Jan. 21, 2022 (GB) ...................................... 2200751

(51) Int. Cl.
*A45C 15/00* (2006.01)
*A45C 3/00* (2006.01)
(Continued)

(52) U.S. Cl.
CPC ................ *A45C 15/00* (2013.01); *A45C 3/00* (2013.01); *G09F 9/301* (2013.01);
(Continued)

(58) Field of Classification Search
CPC ........... G09G 9/03; G09G 9/035; G09G 9/301
See application file for complete search history.

(56) References Cited

U.S. PATENT DOCUMENTS 11,094,235 B2 8/2021 De Castro Turner et al.
2006/0163303 A1 7/2006 Trutanich
(Continued)

FOREIGN PATENT DOCUMENTS

CN 202487110 U 10/2012
CN 205611972 U 10/2016
(Continued)

OTHER PUBLICATIONS

Patents Act 1977: Search Report under Section 17(5) received in Great Britain application No. GB2115504.9, mailed Mar. 30, 2022.
(Continued)

*Primary Examiner* — Sanghyuk Park
(74) *Attorney, Agent, or Firm* — Cognition IP, P.C.; Edward Steakley

(57) ABSTRACT

According to a first aspect of the present invention, there is provided a bag outer panel element, adapted for the external display of controllably selectable images. The bag outer panel element comprises a support and a display screen module mounted to the support, the display screen module comprising an electronic display screen. The support has an attachment means configured for attachment to a bag outer panel. The display screen module is operatively connected or connectable to control means therefor, said control means being adapted to control the electronic display screen to display a selected image.

36 Claims, 13 Drawing Sheets

(51) Int. Cl.

| | |
|---|---|
| ***G06F 1/16*** | (2006.01) |
| ***G09F 9/30*** | (2006.01) |
| ***G09F 23/00*** | (2006.01) |
| *A63B 55/00* | (2015.01) |
| *A63B 60/58* | (2015.01) |

(52) U.S. Cl.

CPC .... *G09F 23/0066* (2013.01); *A45C 2003/007* (2013.01); *A63B 55/00* (2013.01); *A63B 60/58* (2015.10)

(56) References Cited

U.S. PATENT DOCUMENTS

| | | | | |
|---|---|---|---|---|
| 2009/0237912 | A1* | 9/2009 | Tsai | G09F 21/02 362/84 |
| 2012/0137399 | A1 | 6/2012 | Forte et al. | |
| 2012/0206249 | A1* | 8/2012 | Lee | G09F 21/02 340/432 |
| 2016/0179253 | A1* | 6/2016 | Franklin | H10K 77/111 345/174 |
| 2019/0088212 | A1* | 3/2019 | Itoh | G09F 9/30 |
| 2019/0265750 | A1 | 8/2019 | Crowder | |
| 2021/0092262 | A1* | 3/2021 | Marchione | G06F 1/1626 |
| 2022/0150673 | A1* | 5/2022 | Lord | G09F 21/02 |

FOREIGN PATENT DOCUMENTS

| | | | | |
|---|---|---|---|---|
| CN | 109380853 A | | 2/2019 | |
| CN | 212995144 U | | 4/2021 | |
| CN | 213370496 U | | 6/2021 | |
| CN | 214230262 U | | 9/2021 | |
| WO | WO-2005104888 A1 | * | 11/2005 | A41D 27/085 |
| WO | 2020182967 A1 | | 9/2020 | |

OTHER PUBLICATIONS

International Search Report and Written Opinion of International Search Authority in international application No. PCT/GB2022/052738, mailed Jan. 25, 2023.

* cited by examiner

BAG OUTER PANEL ELEMENT FOR THE EXTERNAL DISPLAY OF CONTROLLABLY SELECTABLE IMAGES

CROSS-REFERENCE TO RELATED APPLICATIONS

This application is a 35 U.S.C. § 371 U.S. National Stage application of International Application No. PCT/GB2022/052738, filed on Oct. 27, 2022, which claims the benefit of priority of Great Britain Application No. 2200751.2, filed on Jan. 21, 2022, and Great Britain Application No. 2115504.9, filed on Oct. 28, 2021, which are incorporated herein by reference in their entirety.

FIELD OF INVENTION

The present invention relates to a display screen mounted to a bag, to its method of manufacture and to its method of use. More particularly but not exclusively, it relates to a display screen integrated into a sports bag.

BACKGROUND

In many professional sports, there exists a requirement for sports bags to be used for holding equipment (for example golf bags and tennis bags, and such like). Because these bags are often on public display, they are commonly used for the purpose of displaying sponsorship advertising.

Typical bag construction usually takes the form of multiple sections or panels, the panels being sewn and/or glued together to form a complete bag. In the following discussion, such sections forming part of the exterior surface of a bag are referred to as bag outer panels.

In the context of professional sports, one or more of these panels typically comprise sponsorship advertising, for example through the display of company logos and/or slogans. Such advertising may be added to the panels of a bag by embroidery, painting, screen printing and other methods. While this is an established and well-understood method of advertising on a bag, the bag is limited to displaying one set of logos. It is very difficult to change the advertising displayed on a particular bag using the above techniques at all, much less in a dynamic manner.

Attempts have been made in the art to integrate changing image displays into bags. However, the nature of these attempts typically impose changes on the natural contours of the bag, add significant weight, take up significant internal bag space, and/or demonstrate sub-optimal optical properties.

It is hence an object of the present invention to provide apparatus for displaying graphical material on a bag, that obviates the above disadvantages of existing approaches and allows graphics to be changed responsively, rapidly, effectively, economically and without risking the integrity of the bag.

It is also an object of the present invention to provide methods for the manufacture of such apparatus, and for the manufacture of components of such apparatus. It is a further object of the present invention to provide an improved method of arranging the sale and presentation of promotional space on a bag, using such apparatus.

SUMMARY OF INVENTION

According to a first aspect of the present invention, there is provided a bag outer panel element, adapted for the external display of controllably selectable images. The bag outer panel element comprises a support (for example fabricated from a hard or soft, optionally flexible, plastics material) and a display screen module mounted to the support, the display screen module comprising an electronic display screen (preferably a reflective display such as e-paper or similar). The support has an attachment means configured for attachment to a bag (for example as a bag outer panel, or for attaching to an existing bag outer panel). The display screen module is operatively connected or connectable to control means therefor, said control means being adapted to control the electronic display screen to display a selected image. Optionally, the outer surface of the bag outer panel element is shaped so as to continue a profile of a surface of the bag outer panel (thus allowing the bag outer panel element to conform to, match, or complement the natural contours of the bag).

Advantageously, by providing a bag outer panel element that includes the support above, a) the display screen module can be made to conform to a desired profile, and b) easy (and in some examples, removable) attachment to the bag itself is facilitated. Thus the bag outer panel element provides for improved integration of an electronic display screen in a bag, and moreover in a way that disguises and blends the display in with the surround bag.

The support comprises an optically clear element (for example providing at least part of the outer surface of the bag outer panel element), wherein the display screen module is mounted to the optically clear element so as to be visible through (i.e. any image displayed by the electronic display screen is visible through the optically clear element), and optically coupled to, the optically clear portion. As used herein, "optically clear" means substantially transparent to some, and preferably all visible wavelengths of the electromagnetic spectrum. "Optically coupled" means that components are linked together in such a way as to reduce generation of internal reflections. The optical coupling is such that the gap between the electronic display screen module and the optically clear element is filled with a non-gaseous filler medium/material (that is, one or more optically clear liquid, solid or gel components, for example an optically clear adhesive with or without other optically clear materials), preferably having a refractive index substantially the same as (e.g. matching or close to) the refractive index of the optically clear element. Advantageously, this further facilitates the displays having a range of different outer surface profiles, while reducing/avoiding undesirable optical effects including internal reflections, as well as enhancing image contrast as seen by a viewer. Optionally the optically clear element is shaped so as to continue a profile of a surface of the bag outer panel.

In some embodiments, the optically clear portion is a portion of the support (integral to the support). That is, the optically clear portion is unitary with the support. For example, the support itself may comprise a single optically clear element. In these embodiments, the display screen module is mounted underneath the support, i.e. such that the electronic display, and images displayed thereon, are visible through the support. Advantageously these embodiments facilitate simple manufacture. In such embodiments, the support is preferably affixed to a frame, for example having a greater stiffness than the support. Advantageously, provision of a frame in such a way improves the robustness of the display. Optionally the frame has a stiffness that is greater than or equal to the stiffness of the support, and is optionally pre-formed to a desired shape such that the support can be formed over the frame during manufacture to take on the desired surface profile. If the support is made from a flexible optically clear material (for example "soft PVC" or another optically clear material configured to deform in use), there is preferably provided an intermediate optically clear stiffening layer between the electronic display and the support (e.g., forming part of the intermediate optical medium), the stiffening layer having a stiffness greater than that of the support but less than that of the electronic display and optionally extending beyond a perimeter of the electronic display, advantageously preventing discontinuous bending of the bag outer panel element.

In alternative embodiments, the support has a recess formed therein (e.g. comprising walls extending from the support towards an interior of the bag in use, the walls extending between an outer surface of the support and a floor of the recess), wherein the display screen module is held conformably within the recess. Optionally a floor of the recess substantially matches the profile of the surface of the bag outer panel (for example matching the natural contours that the bag would have had were no bag outer panel element installed). In these embodiments, the display screen module is mounted above the support, such that viewable side of the display faces away from the support. The optional optically clear element in this case is positioned above the display screen module, such that the display screen module is positioned between the optically clear element and the support. Advantageously, provision of the recess provides a convenient means to retaining, securing and protecting the display screen module.

Preferably the electronic display screen is a flexible electronic display screen and is mounted to the support such that the flexible electronic display screen has curvature in at least a first plane. Further, an outer surface of the optically clear element preferably has curvature in at least the first plane and a second plane. For example, where the optically clear element is a portion of the support, the optically clear element may be formed so as to have a varying thickness, and/or an optically clear filler material be provided between the optically clear element and the display screen module, such that optical coupling is achieved with the flexible display screen curving in one plane, while presenting an outer surface having a compound curved profile. Where the display screen module is housed in a recess in the support, the optically clear portion is optionally formed from an optically clear filler material (e.g., part of the intermediate optically clear medium) applied to the display screen module and formed to a desired surface profile. Advantageously, this arrangement means that the portion of the bag outer panel element from which images are displayed can take a profile having compound curves—this is something which is very difficult to achieve using a flexible display screen alone, as such screens typically only permit curvature in one plane at a time.

The attachment means optionally comprises a plurality of holes configured to receive a thread (e.g. to facilitate sewing onto a bag), or a fastener (either releasable, or non-releasable). Suitable fasteners include: a zip fastener/clasp locker configured to interact with a corresponding zip fastener/clasp locker on the bag; magnets/magnetic material configured to interact with a magnetic material/magnet on the bag; a hook/loop fastener configured to interact with a loop/hook fastener on the bag; an adhesive; staples; press studs; and sewn seams or holes configured to receive a thread for sewing to the bag. As will be appreciated, other suitable means can be provided to attach the bag outer panel element to a bag. The attachment means may comprise various combinations of the above.

In some embodiments, the support comprises a lip portion or flange, the lip portion extending from at least part of a periphery of the support and extending substantially towards an interior of a bag in use, e.g. extending at an angle with respect to an outer surface of the bag panel element. For example, the lip portion may be a curved and/or angled part of the support that points substantially inwards (i.e. towards the inside of the bag when the bag outer panel element is fitted to a bag outer panel on a bag). In this arrangement, either the lip portion comprises the attachment means, or a tab (for example made from the same material as the bag outer panel/the bag) is secured to the lip portion, and the tab comprises the attachment means. Advantageously, this arrangement helps to create a robust yet hidden join between the support and surrounding material. Further, the lip provides additional rigidity and strength to the support. Alternatively, where a frame is provided, optionally either the frame comprises the attachment means or the frame is secured to the tab.

According to a second aspect of the invention, there is provided a bag comprising the bag outer panel element above.

According to a third aspect of the invention, there is provided a method for displaying images on a bag, the method comprising: providing the bag above; providing one or more instructions for generation of an image (e.g. an advertising image) on the display screen module; defining one or more conditions under which an image is to be displayed; providing the defined one or more conditions to the control means (for example by storing the one or more conditions at the control means, and/or transmitting the one or more conditions to the control means from an external server); and controlling, with the control means, the electronic display such that the image is displayed responsive to the control means detecting that the one or more conditions are satisfied. Optionally the one or more conditions include one or more of: a specific time, date, or period of time (for example during a sporting event or during a particular match); the bag being at a first location (e.g. at a sports venue, at a press conference area, etc.), wherein the control means includes a location determining means (e.g. a GPS module); and receipt, by the control means, of a signal from an internal sensor or external source (e.g. in response to an instruction from an external server or in response to a local motion sensor).

According to a fourth aspect of the invention, there is provided a method for producing bag outer panel element, the method comprising: providing a support; mounting (preferably non-releasably mounting) a display screen module to the support, the display screen module comprising an electronic display screen; connecting an attachment means to the support, the attachment means configured for attachment to a bag outer panel or a bag; and providing a control means operatively connected or connectable to the display screen module, said control means being adapted to control the electronic display screen to display a selected image.

Optionally, providing the support comprises shaping (for example preforming) the support and providing an optically clear portion in the support (for example, forming the entire support from an optically clear material), or alternatively shaping the support/optically clear portion over the frame described above. In such examples, mounting the display screen module to the support comprises applying an optically clear adhesive to the support proximate to the optically clear portion and applying the display screen module to the optically clear adhesive (or applying the optically clear adhesive to the display screen module and applying the support to the optically clear adhesive), such that the display screen module is optically coupled to, and visible through, the optically clear portion. The optically clear adhesive preferably fills any gap between the display screen module and the optically clear portion. Optionally, the display screen module is flexed so as to have curvature in at least one plane prior to attaching to the optically clear portion. Accordingly the method enables effective manufacture a bag outer panel element where the display screen module is positioned beneath a support, having good optical properties and a surface profile with complex, e.g. compound curvature.

Optionally, providing the support comprises shaping (e.g. preforming) the support so as to include a recess. In this example, mounting the display screen module (either with or without an optically clear portion affixed) to the support comprises removably attaching the display screen module to an installation jig or frame. Optionally, the optically clear portion is attached to, and forms part of, the display module prior to the display module being removably attached to the installation jig. The installation jig is configured to lie substantially flush with at least a perimeter of an outer surface of the optically clear portion (either because the installation jig is flexible, or preformed to the appropriate shape, or both), and the installation jig has outside dimensions greater than corresponding outside dimensions of the display screen module such that the installation jig extends beyond edges of the display screen module. Mounting the display screen module to the support further comprises affixing the display screen module to the recess while the display screen is attached to the installation jig (for example bringing the installation jig into contact with the support such that the installation jig overlaps both the support proximate to the recess and the display screen module); and removing the installation jig from the display screen module. Advantageously, use of the installation jig enables accurate alignment of components during manufacture, and helps ensure a flush join between the display screen module and the support. The method thus provides an effective and accurate means for manufacturing bag outer panel elements in which the display screen module is housed within a recess in the support. Optionally, the installation jig comprises one or more UV radiation sources, and wherein affixing the display screen module to the recess while the display screen is attached to the installation jig comprises: applying UV curable adhesive to at least one of the display module and the recess; positioning the display screen within the recess; and applying UV radiation to the UV curable adhesive using the one or more UV radiation sources. Advantageously this provides a particularly convenient means for securing the display screen module to the recess.

FIGURES

Embodiments of the present invention will now be described more particularly and by way of example, in which.

DETAILED DESCRIPTION

Figure 1A:
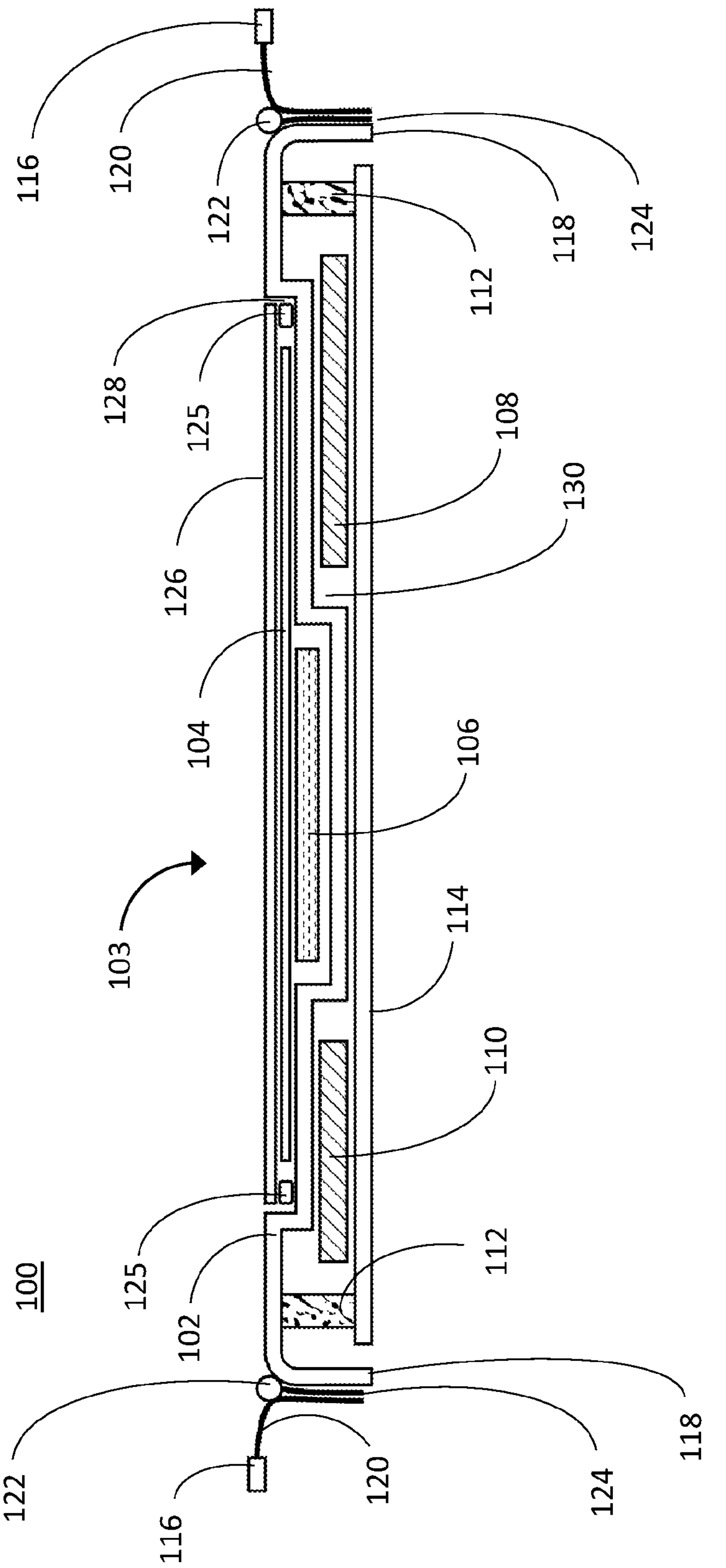
FIGS. 1A to 1C show schematic cross sections of a bag outer panel element in accordance with a first embodiment of the invention.

The following describes specific embodiments of the present invention in detail. These described embodiments are illustrative only. Like reference numerals refer to like elements throughout. Relative terms such as "outer" and "outside" as used herein are to be understood in relation to the exterior of a bag. Similarly, terms such as "inner" and "inside" as used herein are to be understood in relation to the interior of a bag.

While the embodiments below are discussed primarily in relation to sports bags, it will be readily appreciated that the present invention may equally be applied to other types of bags including, for example, insulated food delivery/transportation bags.

A first embodiment of the invention is shown in FIGS. 1A to 1D.

FIG. 1A shows a schematic cross-sectional view of a bag outer panel element 100 (that is an element that forms part of, or the entirety of, a panel of the outer surface of a bag) in accordance with a first embodiment of the invention. The bag outer panel element 100 includes a support 102, to which a display screen module 103 is mounted (preferably non-releasably mounted). The support 102 is preferably shaped so as to generally correspond to, or complement, existing profiles on the bag to which the bag outer panel element 100 is to be attached. For example, the profile of the support 102 optionally mirrors the profile of an existing bag outer panel on a bag, which is to be replaced by the bag outer panel element 100.

The display screen module 103 comprises an electronic display 104 and an image controller 106. Preferably the electronic display 104 is a flexible display screen. More preferably, the electronic display 104 is a flexible reflective display such as e-paper or similar. Advantageously, because reflective displays operate by reflecting ambient light rather than emitting light (in contrast to backlit displays), their viewing properties remain consistent under changing ambient lighting conditions. Thus the use of a reflective display in particular enhances the seamless appearance of the bag outer panel element 100. For example, use of reflective display (especially when combined with the sheet of plastic material described below) may disguise the fact that an electronic display is present at all, the bag on which the bag outer panel element 100 is installed appearing as any normal bag until the image displayed on the (reflective) electronic display 104 changes.

The bag outer panel element 100 also comprises an optically clear element 126, which is optically coupled to the electronic display screen 104 by a non-gaseous optically clear medium (e.g., an optically clear adhesive and/or other optically clear liquid, solid or gel materials). This optical coupling advantageously reduces internal reflections and improves the contrast of images displayed on the electronic display as seen through the optically clear element 126. The optically clear element 126 also serves to provide protection and optionally additional support to the electronic display screen. In the embodiment illustrated in FIG. 1A, the optically clear element 126 extends beyond the periphery of the electronic display screen 104, and is affixed to the bottom of the recess 128 by means of adhesive 125, thus acting to retain both the optically clear element 126 and the electronic display screen 104 in the support 102.

Also shown in FIG. 1A is a separate display controller 108 linked to the image controller 106 by a suitable cable (not shown)—however, in alternative arrangements the image controller 106 and the display controller 108 may be integrated into a single unit. A battery 110 is also provided, configured to provide power to the electronic display 104, the image controller, and the display controller 108.

The display controller 108 is configured to control the content displayed on the electronic display 104. For example, the display controller 108 may cause the electronic display 104 to display dynamic/changing advertising content, according to predetermined conditions (for example location or time during a sports competition), or external triggers (such as sale of advertising time). Optionally, the display controller 108 includes, or is communicably coupled to a wireless communication module (not shown) in order to receive external instructions on what content to display of the electronic display 104. Advantageously, the invention can thus dynamically change the content displayed on a bag without the need to manually remove markings from the bag.

Optionally, the bag outer panel element 100 includes further electronic components such as a location module (e.g. a GPS module) and a motion detection module (e.g. an accelerometer, inertial measurement unit, etc.). In these examples, the display controller 108 is configured to change the content displayed on the electronic display 104 responsive to a signal from the further electronic components. For example if the location of the bag changes, or if the bag moves, a signal can be sent to the display controller 108 from the location module and/or the motion detection module, causing the display controller 108 to change what is displayed on the electronic display 104.

Though shown as being part of the bag outer panel element 100, the display controller 108, battery 110, and any wireless communication module may be communicably coupled to the electronic display but positioned within the bag remote from the bag outer panel element 100.

In this embodiment, the display screen module 103 is housed within a recess 128 of the support 102. Advantageously this provides a convenient means for assisting aligning (during manufacture), securing and also protecting the display screen module 103. As shown, the recess 128 has a varying depth to accommodate the electronic display 104 and the image controller 106. However it will be appreciated that a recess having a different profile can be provided according to the profile of the display screen module 103 being housed.

The support 102 itself is preferably formed from a plastics material. Preferably the support 102 in this embodiment is relatively hard, however the support may have a degree of flexibility. Possible materials for forming the support 102 include composite moulded laminate, polycarbonate, injection-moulded plastic, and vacuum formed plastic. For example, polycarbonate having a thickness of between 0.5 mm and 3 mm is suitable.

Optionally, some electronic components such as the battery 110 and the display controller 108 are positioned between the support 102 and a protective panel 114, the protective panel 114 and the support 102 being attached by means of a frame 112. The protective panel may be formed of any suitable material, such as a rigid or semi-rigid plastics material. Preferably the protective panel has a material and dimensions such that its stiffness is the same as or similar to the stiffness of the support 114. The protective panel 114 may be attached to the frame 112 by any suitable attachments means, for example by an adhesive and/or one or more screws. In the event that the electronic component protected by the protective panel 114 include a wireless communication module, the protective panel 114 is preferably substantially transparent to, or includes a window that is substantially transparent to, electromagnetic radiation at wireless communication frequencies. Because the electronic display 104 is positioned on the opposite side of the support 102 to other electronic components, holes (not shown) are included in the support 102 to allow appropriate cabling to pass between components.

Optionally, any voids 130 between the support 102, the frame 102 and protective panel 114 not occupied by other components are filled or partially filed with a foam (not shown) or other material configured to support the various components and provide cushioning in the event of impact to the bag outer panel element 100.

To secure the bag outer panel element 100 to a bag outer panel or bag, the bag outer panel element 100 includes attachment means 116. The attachment means 116 can be any suitable attachment means, for example: a zip fastener/clasp locker configured to interact with a corresponding zip fastener/clasp locker on the bag; magnets/magnetic material configured to interact with a magnetic material/magnet on the bag; a hook/loop fastener configured to interact with a loop/hook fastener on the bag; an adhesive; staples; press studs; and sewn seams or holes configured to receive a thread for sewing to the bag. As will be appreciated, other suitable means can be provided to attach the bag outer panel element to a bag. The attachment means 116 are shown located proximate to a perimeter of the bag outer panel element 100 (for example extending around all or part of the perimeter of the bag outer panel element 100), though it will be appreciated that attachment means 116 could be located at other positions on the bag outer panel element 100.

Optionally, the bag outer panel element 100 includes a lip portion 118, such as a flange, the lip portion 118 extending from at least part of a periphery of the support and extending substantially towards an interior of a bag in use. As shown, the lip portion 118 generally extends at an angle with respect to the outer surface of the bag outer panel element 100/support 102. In the example of FIG. 1A, the lip portion 118 curves inwardly from the support 102 and extends at around 90 degrees to a major portion of the support 102, however it will be appreciated that other angles and curvature can be used for the lip portion, for example depending on the shape of the bag to which the bag outer panel element 10 is to be fitted. In this case the lip portion 118 is attached to a tab 120 (for example via adhesive or other means), which provides an intermediate portion between the attachment means 116 and the support 102. The tab 120 may be made from a material more flexible that the support 102 to facilitate easier attachment of the bag outer panel element 100 to a bag outer panel or bag. Optionally, the tab is fabricated from the same material (for example fabric, leather, faux leather, plastic, etc.) as the bag outer panel or bag to which the bag outer panel element 100 is to be attached. Advantageously, the combination of lip portion 118 and tab 120 helps to create a robust yet hidden join between the support 102 and surrounding material of the bag or bag outer panel.

In alternative examples, the attachment means 116 is attached directly to the support 102 without an intermediate tab.

Also shown in FIG. 1A is an optional beading 122 and beading support fabric 124, provided for aesthetic purposes.

Figure 1B:
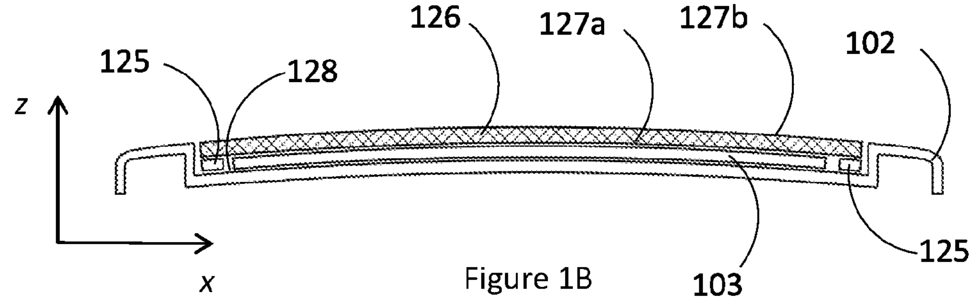
Figure 1C:
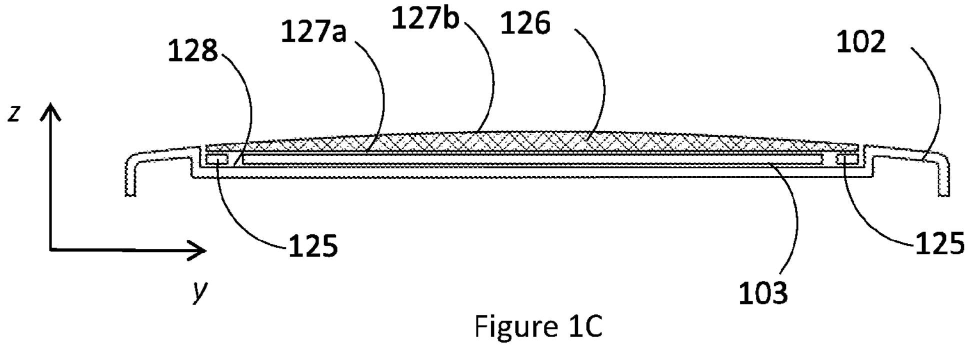

As shown in FIGS. 1B and 1C, the bag outer panel element 100 also comprises an optically clear element 126, through which the images displayed by the electronic display 104 are visible. In this embodiment, the optically clear element 126 is a separate element (for example fabricated from optically clear plastics material) optically coupled to the display screen module 103. In this example, optical coupling is again achieved by substantially filling the gap between the optically clear element 126 and the electronic display screen 104. Optionally, the optically clear element 126 is fabricated from sheet material flexed into a desired profile, or preformed (e.g. by moulding, machining, or vacuum forming), and an optically clear adhesive is used to secure the optically clear element 126 to the display screen module 103. In further examples, the optically clear element 126 may comprise a portion fabricated from optically clear filler material deposited onto an optically clear preformed or sheet material element.

Alternatively, the optically clear element 126 is formed from an optically clear filler material (for example an optically clear epoxy), which is deposited onto the display screen module 103. Once the optically clear filler material has dried and/or cured, it is then sanded, ground or machined to the desired profile, and then polished such that the display module 103 is clearly visible through the optically clear filler material. In this arrangement, the optically clear filler material functions as both the optically clear element 126 and the optically clear medium that ensures optical coupling with the electronic display screen.

Though the extent of the optically clear element 126 is shown as corresponding to the extent (e.g. area) of the display screen module 103 in FIGS. 1B and 1C, the optically clear element 126 more preferably extends beyond the edges of the display module 103. Where the optically clear element 126 is formed from an optically clear filler material, this allows the filler material to also fill in any gap in the recess surrounding the display module. Where the optically clear element 126 is preformed or formed from sheet material, this provides an edge region of the optically clear element 126 to which adhesive can be applied, thereby providing means to secure the optically clear element 126 to the recess 128 and/or portions of the support 102 proximate to the recess.

Advantageously, the present embodiment allows for the bag outer panel element 100 to have a curved outer profile above the display screen module 103, as shown in FIGS. 1B and 1C. FIGS. 1C and 1B show cross sections of the same bag outer panel element 100 in orthogonal planes. Some features shown in FIG. 1A are omitted in FIGS. 1A and 1C for clarity of explanation. The electronic display screen 104 is a flexible electronic display and has curvature in a first plane xz as shown in FIG. 1B.

The optically clear element 126 is curved on an inside surface 127*a* and an outside surface 127*b*, in the first plane xz, to match the curvature of the electronic display screen 104.

To provide a compound curvature (i.e. curvature in more than two planes) on the outer surface of the bag outer panel element 100, the electronic display screen 104 and the inside surface 127*a* of the optically clear element 126 have little or no curvature in the second plane yz, while the outside surface 127*b* of the optically clear element 126 is provided with curvature in the second plane yz. Advantageously, this allows the bag outer panel element 100 to exhibit complex and compound curves (for example matching the natural curves that a bag would ordinarily have in absence of a bag outer panel element including a display), without subjecting the flexible electronic display to significant mechanical stress. To achieve the desired surface profile, in one example the optically clear element 126 is formed from optically clear epoxy resin applied to the display screen module 103 that, when set, is ground, sanded or machined to the correct profile and then polished to an optically clear finish.

Figure 1D:
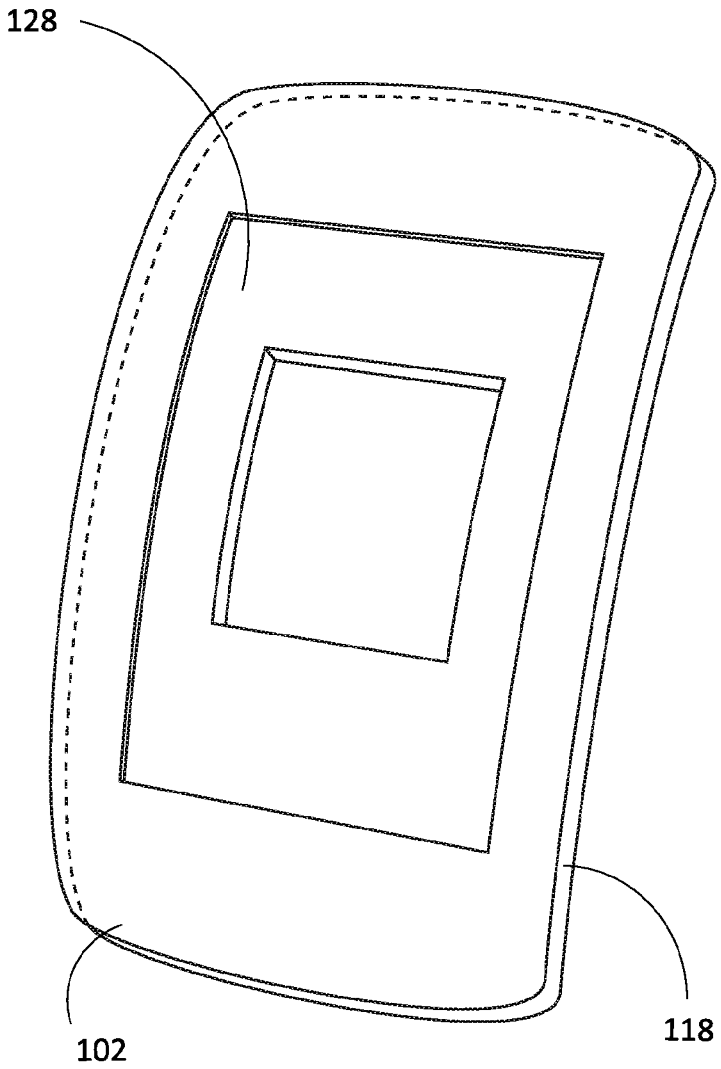
FIG. 1D shows a perspective view of a support suitable for use in the bag outer panel element of FIGS. 1A to 1C.

FIG. 1D shows a perspective view of the support 102 of this embodiment, showing the lip 118 and recess 128. The shape of the perimeter of the support 102, and the shape of the electronic display 104 can be tailored to the bag on which the bag outer panel element 100 is to be attached.

Optionally, the bag outer panel element 100 also comprises a solar panel (not shown), for example located within a further recess in the support 102 and electrically connected to the battery 110. The bag outer panel element 100 is thus beneficially a self-contained display unit which can function when attached to a bag even in the absence of external power connections.

Figure 1E:
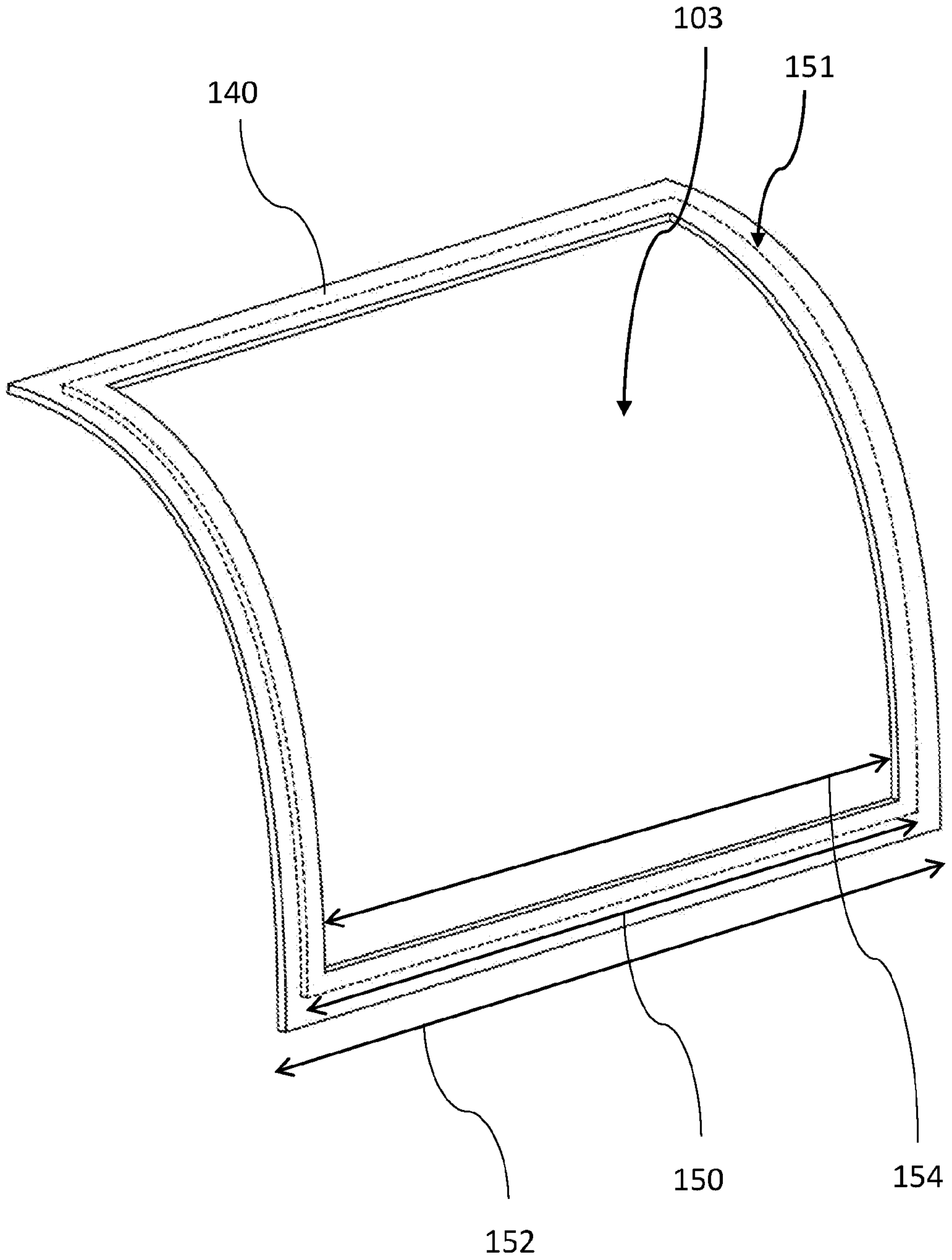
FIG. 1E shows a perspective view of an exemplary jig to assist in assembly of the bag outer panel element of FIGS. 1A to 1C.

FIG. 1E shows an installation jig or frame used to enable easier manufacture of the bag outer panel element 100.

The installation jig 140 may be flexible and/or shaped to conform to the profile of a perimeter of the outer surface of the display screen module 103, (preferably with, but alternatively without the optically clear element 126 attached (for example following the curvature of the display screen module 103 or optically clear element 126 shown in FIGS. 1B and 1C). In examples where the shape of the installation jig 140 is pre-formed, it will be appreciated that the shape of the display screen module 103, and thus the shape of the installation frame 140 may depend on the shape of the support 102 on which the display screen module 103 is to be installed. In one example, the installation frame 140 is fabricated from a plastics material such as a flexible plastics material that can be flexed (or alternatively moulded) to the desired profile.

Preferably the optically clear element 126 is formed from sheet material or otherwise preformed, and is removably affixed to the installation jig 140 prior to assembly of the other components of the display screen module 103. Advantageously this allows the installation jig 140 to act as a support while assembling the other components of the display screen module 103. Alternatively, the optically clear element 126 is removably affixed to the installation jig 140 after two or more of the other components have been assembled (e.g. after the optically clear element 126 has been affixed to the flexible display screen 104). In a less preferred alternative, the display screen module 103 is removably attached to the installation jig 104 directly, and the optically clear element 126 is added after the display screen module 103 has been attached to the recess 128.

Optionally the optically clear element 126 (or display screen module 103) is removably affixed to the installation frame 340 using a temporary adhesive, for example using a double-sided adhesive tape between the optically clear element 126 (or display screen module 103) and the installation jig 140.

An adhesive is applied at a position proximate to the perimeter of the electronic display 104. The adhesive may either be applied: to a perimeter portion of the floor of the recess 128; to a perimeter portion of an inside surface (a surface facing the recess 128 in use) of the electronic display 104 or display screen module 103; to a perimeter portion of an inside surface (a surface facing the recess 128 in use) of the optically clear element 126 (particularly where the optically clear element 126 extends beyond the perimeter of the display module 103, as noted above); or a combination of the above. Alternatively the adhesive may be positioned at other locations between the recess 128 and the display screen module 103.

The installation jig 140 is then manoeuvred so as to position the display screen module 103 in the recess 128.

Preferably the installation frame 140, along with the electronic display screen 104, is flexible. In this example, when the electronic display screen 104 is brought into contact with the recess 128 using the installation frame 140, both the installation frame 140 and electronic display 104 are caused to flex, such that the electronic display screen 104 conforms to the shape of the recess and consequently the electronic display 104 is conformal with a surface profile of the recess 128 (for example continuing a profile of the support 102, in turning continuing or matching a surface profile of the bag outer panel). Alternatively, the installation frame 140 can be pre-formed to a shape that corresponds to the shape of the support 102.

In some examples a further external mounting jig (not shown) may be connected to the installation jig 140 and configured to hold the installation frame (and thus the assembled display screen module 103) in place during curing of the adhesive. Optionally such an external mounting jig can also be shaped to conform to the contours of the specific display screen module 103 being fitted. Alternatively, a temporary adhesive or other removable attachment means can be provided to temporarily secure the installation frame 140 to the support 102 during curing of the adhesive.

As shown in FIG. 1E the outer edges of the display screen module 103 (behind the installation frame 140 from as viewed in FIG. 1E) are indicated by broken lines 151. Preferably the installation frame 140 is configured to have outside dimensions 152 greater than corresponding outside dimensions 150 of the display screen module 103, and an inner cut-out with inside dimensions 154 less than corresponding outside dimensions 150 of the display screen module 103 (these relative dimensions apply for each edge of the display screen module 103; the dimensions are shown with respect to only one edge in FIG. 1E for ease of illustration). Thus the installation frame 140 bridges the marginal edges of the display screen module 103. Advantageously this allows the outer surface of the optically clear element 126 to be held, by the installation jig 140, conformally (e.g. flush) with the outer surface of the support 102 proximate to the recess 128 while the support 102 and display screen module 103 are attached.

In an example, the adhesive applied to the recess 128 and/or to the display module 103 is a UV curable adhesive, and the means for removably affixing the display screen module 103 (or optically clear element 126) to the installation frame 340 is at least partially transparent to UV radiation (for example double-sided adhesive tape). In this case, following positioning of the display screen module 103 within the recess 128, the adhesive is subjected to UV radiation (e.g. through the optically clear portion) through until cured. In this example, the mounting frame 140 optionally includes one or more UV light sources (for example a series of UV LEDs), configured to provide UV radiation to cure the UV adhesive.

After the adhesive has cured, the installation frame 140 is then removed from the optically clear element 126 (or display screen module 103). Any join line between the support and the now installed display screen module 103 is preferably then filled using a suitable filler material. The filler material is then smoothed if required.

Advantageously, use of the installation frame 140 increases the speed with which the bag outer panel element 100 can be accurately assembled, while ensuring that the outer surface of the optically clear element 126 is flush and in line with the contours of the surrounding support 102.

A second embodiment of the invention is shown in FIGS. 2A to 2D.

The second embodiment provides a bag outer panel element 200*a*, 200*b* comprising, a display screen module 203 (comprising an electronic display 204), an image controller 206 and a display controller 208 (in this case shown as an integrated component), a battery 210, a protective panel 214, and an attachment means 216. These elements are substantially as described above in relation to the corresponding components of the first embodiment of FIGS. 1A to 1C. Further optional electronic components (e.g. wireless communication, location detection and motion detection modules) as described in relation to the first embodiment above are similarly optionally provided in this second embodiment. Optional decorative beading 222 and beading support 224 are also provided for aesthetic purposes.

Again, any voids 230 between the support 202, the frame 202 and protective panel 214 not occupied by other components are optionally filled or partially filed with a foam (not shown) or other material configured to support the various components and provide cushioning in the event of impact to the bag outer panel element 200.

The bag outer panel element 200*a*, 200*b* comprises a support 202, which differs from support 102 of the first embodiment above. The support 202 includes an integral optically clear element 226 (in a preferred example the entire support 202 is made from optically clear material, such as optically clear plastics material). The display screen module 203 is non-releasably mounted to an underside of the optically clear element 226, such that images displayed on the electronic display 204 are visible through the optically clear element 226.

The support 202 itself is preferably formed from a plastics material. Preferably the support 202 in this embodiment is relatively hard and stiff, however the support may have a degree of flexibility. Possible materials for forming the support 102 include composite moulded laminate, polycarbonate, injection-moulded plastic, and vacuum formed plastic. For example, polycarbonate having a thickness of between 0.5 mm and 3 mm is suitable. Preferably the support 202 is produced as a curved panel with a perimeter shape and profile matching a desired final shape, using, for example vacuum forming techniques.

A frame 212 is also provided. The frame 212 optionally extends around a periphery of the support 202, for example at or proximate an edge of the support 202/around the outside of a periphery of the electronic display 204. The frame 212 is preferably made from a plastics material and has a stiffness (i.e., the extent to which an object resists deformation in response to an applied force) similar to (e.g., the same as) or greater than stiffness of the support 202. In some examples, the frame 212 is made from an injection-moulded or 3D-printed thermoplastic such as ABS or similar, or an injection-moulded fibre-reinforced thermoplastic, and has a thickness of around 10 mm. The material and shape of the frame 212 is chosen such that it exhibits a stiffness that it is similar to, equal to or greater than the stiffness of the support 202—it will be appreciated that the precise shape and dimensions of the frame 212 will also depend on the desired end shape of the outer bag panel element 200*a*, 200*b*.

Figure 2A:
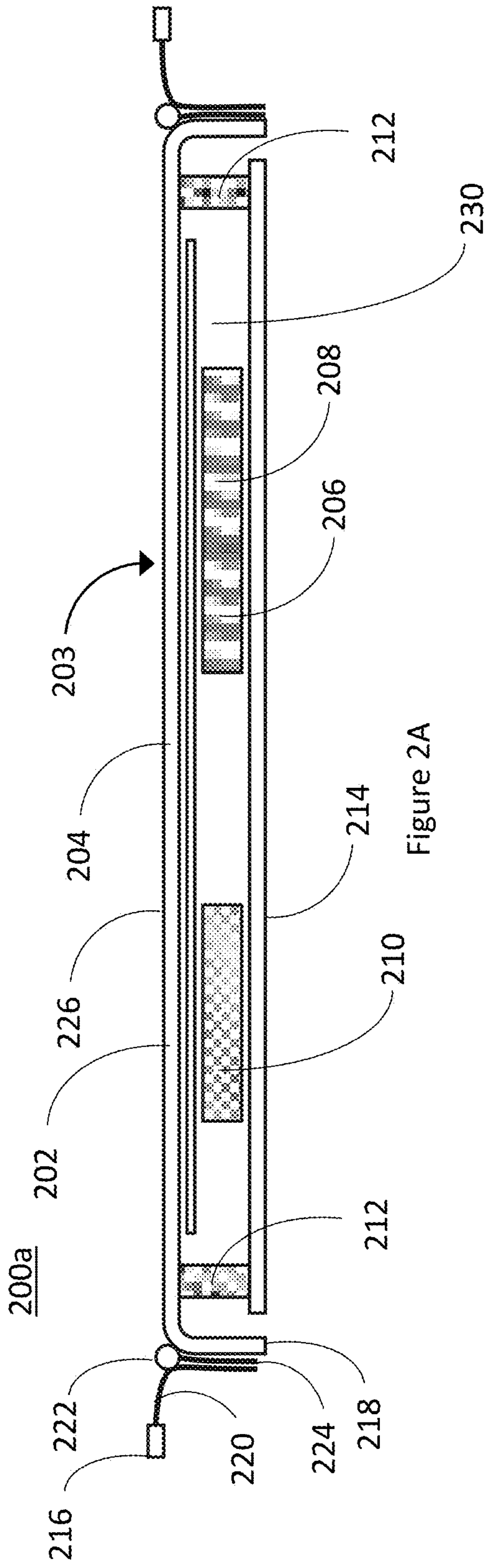
FIGS. 2A to 2D show schematic cross sections of a bag outer panel element in accordance with a second embodiment of the invention.
Figure 2B:
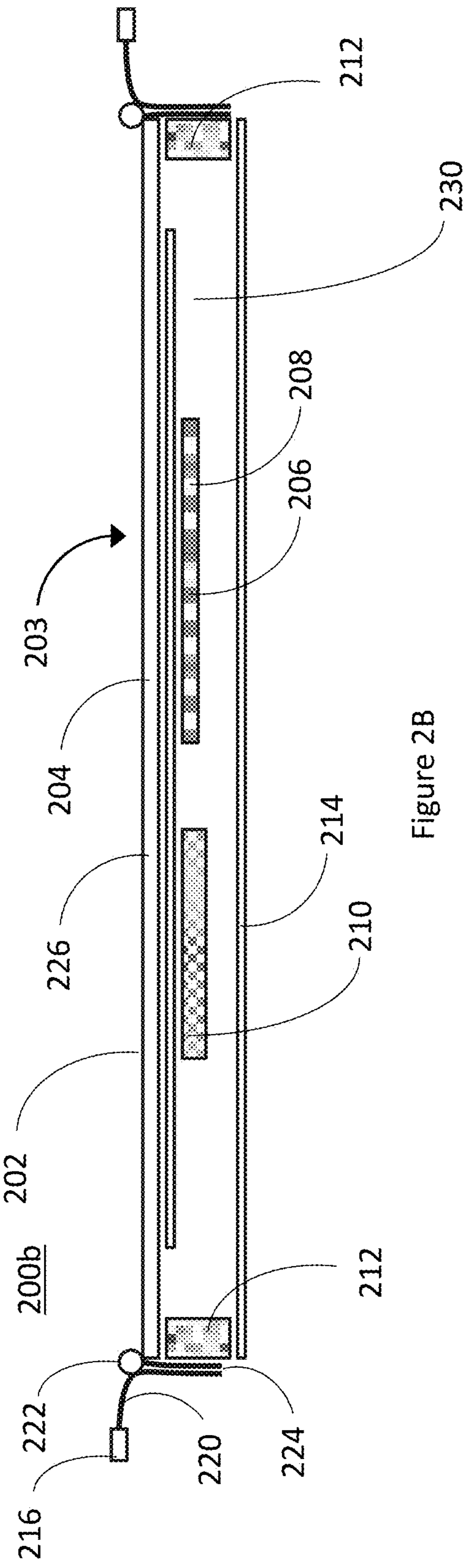

In addition to providing additional rigidity to the bag outer panel element 200*a*, 200*b*, the frame 212 advantageously provides for efficient manufacture of the bag outer panel element 200*a*, 200*b*. During manufacture, the frame 212 is preferably preformed, and the support 202 is subsequently bent around and affixed to the support. Thus, the frame 212 can be shaped so as to hold the support 202 in a desired curved profile, without having to otherwise shape, mould or preform the support 202 itself. In some examples, the frame 212 is affixed to the underside of the support 202 as shown in FIGS. 2A and 2B. In other examples the frame 212 is instead affixed to an outer surface or outer edge of the support 202 (e.g., outside the optional lip 218 discussed below), optionally mechanically constraining the support 202 within the frame 212.

FIG. 2A shows a first example bag outer panel element 200*a*, in which the support 202 includes optional lip portion 218 connected to a tab 220 supporting attachment means 216, which are substantially as described above in relation to the corresponding components of the first embodiment.

FIG. 2B shows a second example bag outer panel element 200*b* in which no lip portion is provided. In this example, the tab 220 is affixed to the frame 212 for additional support.

Figure 2C:
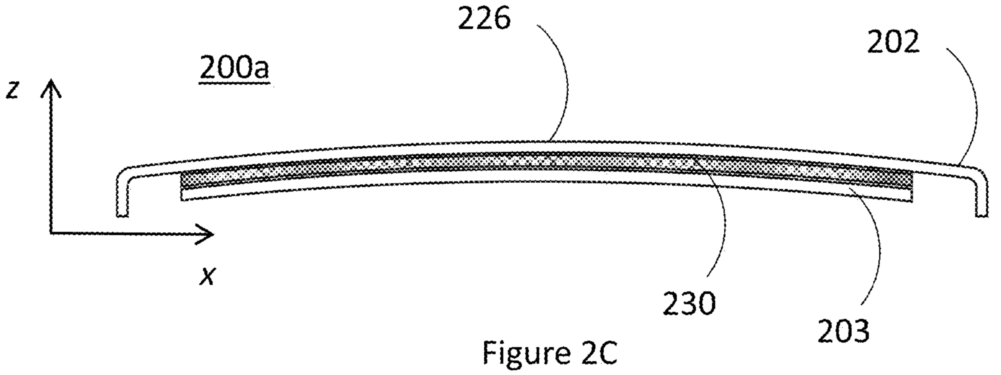
Figure 2D:
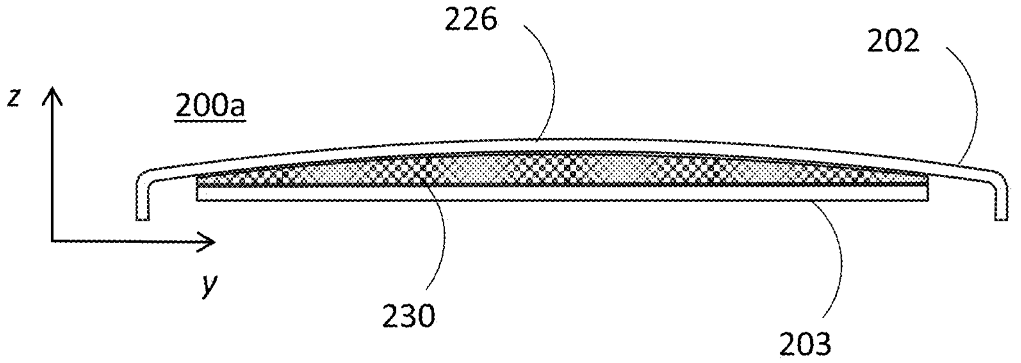

As with the first embodiment, the second embodiment advantageously provides a means for providing a bag outer panel element 200*a*, 200*b* having compound curves without introducing undue stress to the electronic display 204. As shown in FIGS. 2C and 2D, the electronic display is a flexible electronic display, and has curvature in a first plane xz, but no or little curvature in a second orthogonal plane yz. The support 202 including optically clear element 226 is shaped so as to have curvature in both xz and xy planes. The curvature of the optically clear element 226 substantially matches the curvature of the display screen module 203 in the first plane xz. The display screen module 203 is optically coupled to the optically clear element 226 by a liquid or solid optically clear medium substantially filling the gap between the electronic display screen and the optically clear element 226, such as an optically clear adhesive, preferably having a refractive index similar to or the same as the refractive index of the optically clear element 226. Beneficially this reduces distortion caused by air being present between the display screen module 203 and the optically clear element 226, for example reducing internal reflections and improving the contrast of images displayed on the electronic display screen 204 as seen through the optically clear element 226.

Preferably, the support 202 including optically clear element 226 is preformed to the desired profile (e.g. having a compound curved profile). In this example, during manufacture, an optically clear adhesive is applied to the inside surface of the support 202 proximate to the optically clear element 226. The electronic display screen 104 is then flexed (e.g. with curvature in one plane) if required, and brought into contact with the adhesive. Alternatively, the optically clear adhesive can be applied to the electronic display screen in addition to/instead of support 202 before bringing the two components together. This ensures good optical coupling between the optically clear element 226 and the electronic display screen 204.

Figure 3:
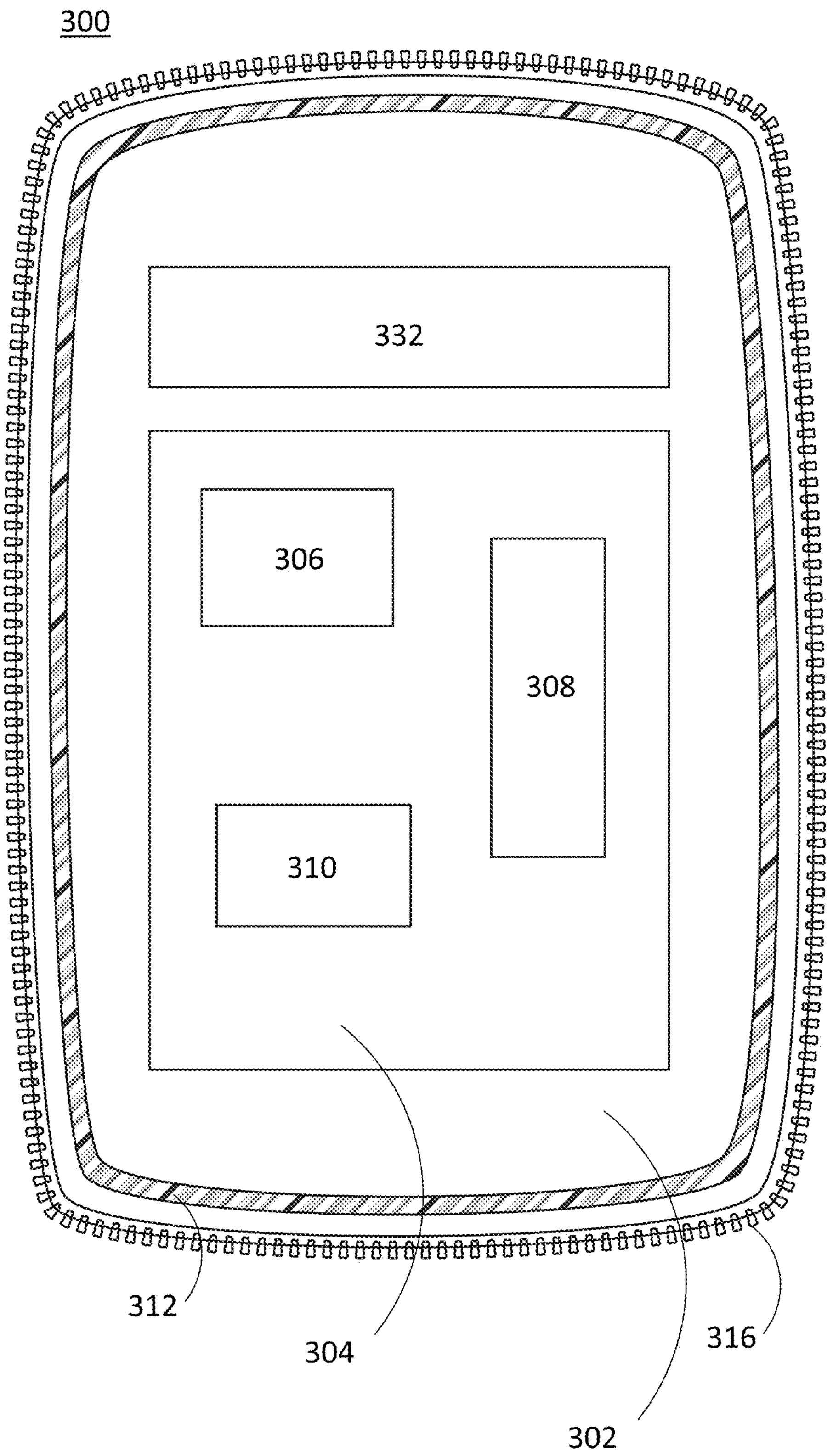
FIG. 3 shows an exemplary schematic plan view of the interior of a bag outer panel element.

FIG. 3 shows a schematic plan view of the rear (inside) of bag outer panel element 300 (for example the bag outer panel element 100 of the first embodiment above of the bag outer panel element 200*a*, 200*b* of the second embodiment above). The bag outer panel element 300 includes a support 302 with an electronic display 304 mounted thereto (either to an underside of the support 302 or with a recess in the support 302). The bag outer panel element 300 includes and image controller 306, a display controller 308, and battery 310 and a solar panel 332. A frame 312 is provided around and proximate to a periphery of the support 302, to which a protective panel (not shown) is attached to retain and protect the electronic components. The bag outer panel element 300 also includes attachment means 316, in this case a zipper (clasp locker), though alternative attachment means can be provided. These elements are substantially as described above in relation to the corresponding features of the first and second embodiments.

Figure 4A:
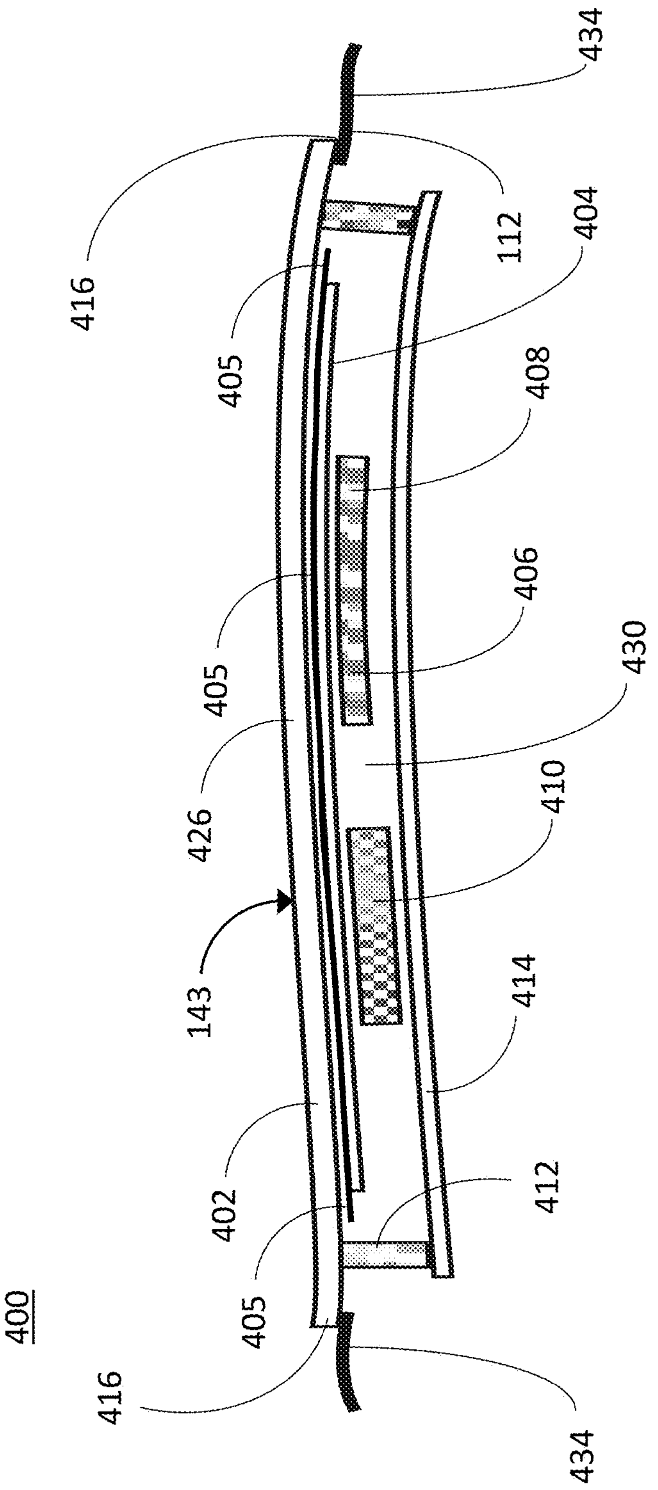
FIG. 4A shows a schematic cross section of a bag outer panel element in accordance with a third embodiment of the invention.
Figure 4B:
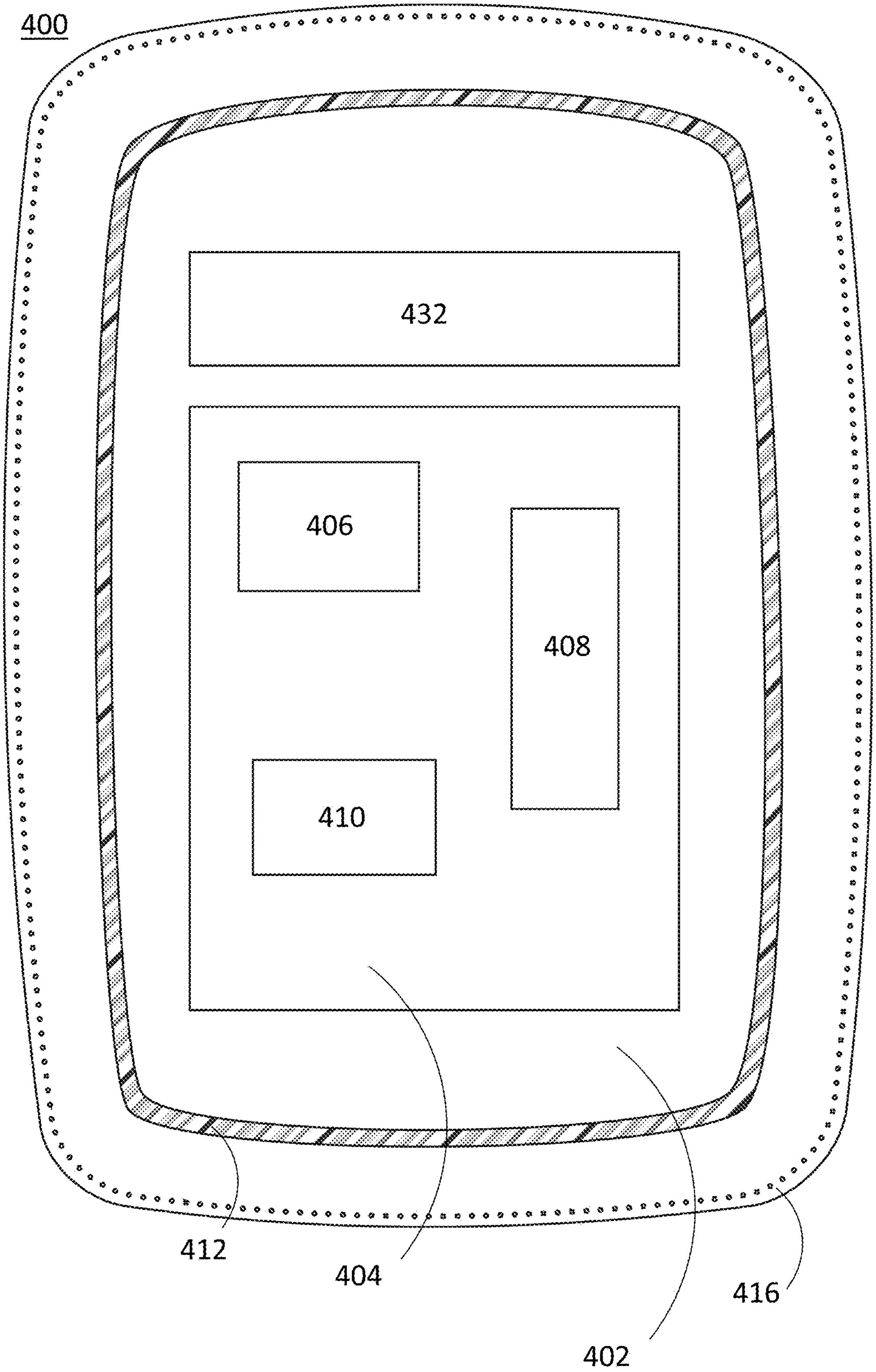
FIG. 4B shows a schematic plan view of the interior of the bag outer panel element of FIG. 4A.

FIGS. 4A and 4B show a third embodiment of the present invention.

The third embodiment provides a bag outer panel element 400 comprising, a display screen module 403 (comprising an electronic display 404), an image controller 406 and a display controller 408 (either as a single integrated component or as individual components), a battery 410, a protective panel 414, and an attachment means 416. Optional solar panel 432 is also provided. These elements are substantially as described above in relation to the corresponding components of the first embodiment. Further optional electronic components (e.g. wireless communication, location detection and motion detection modules) as described in relation to the first embodiment above are similarly optionally provided in this second embodiment.

As with the second embodiment, a support 402 is provided to which the display screen module 403 is non-releasably mounted, the support 402 including an integral optically clear portion 426 (for example the entire support 402 may be made from optically clear material, such as optically clear plastics material). The display screen module 403 is mounted to an underside of the optically clear portion 426 (for example using optically clear adhesive such as a suitable double-sided adhesive tape, or a liquid adhesive), such that images displayed on the electronic display 404 are visible through the optically clear portion 426. As with the above embodiments, the electronic display screen 404 is optically coupled to the optically clear portion 426, such that any gap between the electronic display screen 404 and the optically clear portion 426 is substantially filled with a non-gaseous optically clear intermediate medium (e.g. a gel, solid or liquid material such as a suitable adhesive). A frame 412 is preferably provided, which optionally has the same properties and functionality as the frame 212 described above in relation to the second embodiment. Alternatively, the frame 412 has a similar or lower stiffness than the support 402, so as not to impede flexing of the support 402—in some examples, the frame 412 is made from a flexible foam material.

Figure 4C:
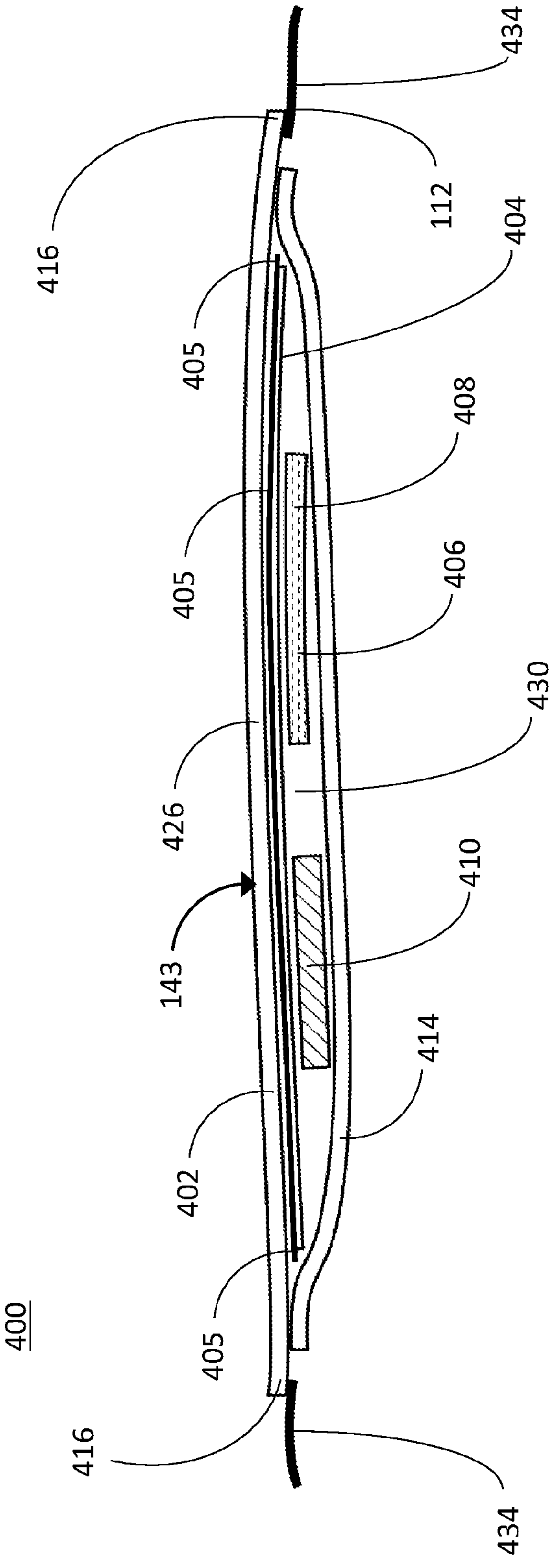
FIG. 4C shows a schematic cross section of an alternative bag outer panel element in accordance with the third embodiment of the invention.

In a variation of this embodiment, the frame 412 is omitted, and the protective panel is attached directly to the support 402. This is shown in FIG. 4

Any, voids 430 between the support 402, and protective panel 414 not occupied by other components are optionally filled or partially filed with a foam (not shown) or other material configured to support the various components and provide cushioning in the event of impact to the bag outer panel element 400.

In this embodiment, the electronic display 404, the support 402 and the protective panel 414 are all flexible, allowing the bag outer panel element 400 to flex. This arrangement is particularly advantageous for use on bag panels which typically undergo flexing in use. In a preferred embodiment, the support 402 is made from a flexible plastics material with a modulus of elasticity of less than 100 MPa, for example less than 50 MPa or less than around 30 MPa (at room temperature), for example around 1.5 to 15 MPa or around 1.5 to 20 MPa, such as PVC-P (plasticized polyvinylchloride) TPU (thermoplastic polyurethane), or PEVA (polyethylene vinyl acetate). PVC-P at thicknesses between 0.25 and 1 mm has been found to display suitable deformation properties. Alternatively, other suitable plastics materials and thicknesses may be used.

In this embodiment, the non-gaseous optically clear intermediate medium comprises an optically clear stiffening layer 405 disposed between the support 402 and the electronic display screen 404. The stiffening layer 405 is fabricated from an optically clear plastics material, and is fixed to the optically clear portion 426 and the electronic display screen 404 in such a way as to ensure good optical coupling to both the optically clear portion 426 and the electronic display screen 404 (for example by using an optically clear adhesive. The intermediate stiffening layer 405 has a stiffness that is greater than the stiffness of the support 402, and less than the stiffness of the flexible electronic display 404. In one example, the intermediate layer is a sheet of optically clear polycarbonate with a thickness of less than 1 mm. Advantageously, the intermediate stiffening layer 405 provides a transition in stiffness between the (preferably flexible) electronic display screen 404 and a more flexible support 402, such that any discrepancy between the stiffness of the electronic display screen 404 and the support 402 is less apparent. In particular, the use of the intermediate stiffening layer 405 helps reduce or avoid occurrence of a sharp bend in the support 402 at the point where the support 402 meets a peripheral edge of the electronic display screen 404, when the display screen module 403 as a whole is bent. Instead, the intermediate stiffening layer 405 ensures a less discontinuous curvature across the display screen module 403.

In this embodiment, the support 402 optionally does not include a lip portion, thereby enhancing the flexibility of the bag outer panel element 400.

As shown in FIG. 4B, the attachment means 116 are provided in the support 402 itself as a series of holes, configured to receive a thread for sewing the bag outer panel element 400 to the material 434 of a bag or bag outer panel. Such holes may be preformed, or may be formed during sewing the material 434 of the bag outer panel element 400 to the bag or bag outer panel. Alternatively a tab may be provided, similar to that described above in relation to the first embodiment.

In any of the first, second or third embodiments, the support 102, 202, 302, 402 and/or the optically clear element 126, 226, 426 may include surface coating or decoration to disguise the edges of the display screen module 103, 203, 403, further seamlessly integrating the display screen module 103, 203, 403 into the bag or bag outer panel.

Figure 5:
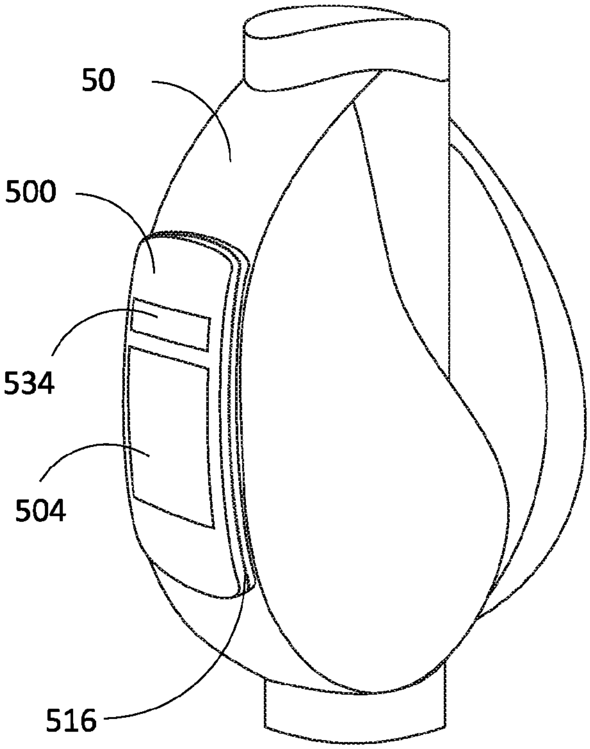
FIG. 5 shows a perspective view of an exemplary golf bag incorporating a bag outer panel element in accordance with the present invention.
Figure 6:
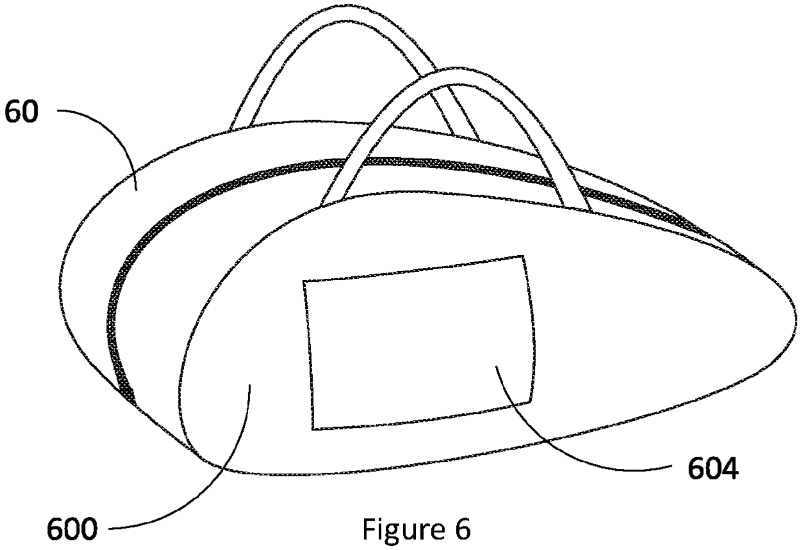
FIG. 6 shows a perspective view of an exemplary tennis bag incorporating a bag outer panel element in accordance with the present invention.

FIGS. 5 and 6 show exemplary sports bags including bag outer panel elements in accordance with the present invention.

FIG. 5 shows a golf bag 50 having a bag outer panel element 500, the bag outer panel element 500 including an electronic display 504, a solar panel 534 and an attachment means 516. In this case the attachment means 516 is a zipper configured to fasten to a corresponding zipper on the golf bag 50. This facilitates easy removal of the bag outer panel element 500, for example for maintenance, battery charging if necessary, repair, etc. The bag outer panel element 500 exhibits a continuous compound curvature across its outer surface.

FIG. 6 shows a tennis bag 60 including a bag outer panel element 600, which an electronic display 604. In this case the bag outer panel element 600 is sewn into the rest of the bag 60 for a seamless appearance. Again, the bag outer panel element 600 exhibits a compound curve profile across its outer surface. An optional solar could also be provided if required.

Though the electronic displays 504, 604 shown in FIGS. 5 and 6 are shown as substantially rectangular, it will be appreciated that they may be any suitable shape.

In general, the bag outer panel elements 100, 200*a*, 200*b*, 300, 400 described above may be attached to an existing bag outer panel on a bag, or replace an existing bag outer panel (that is, attaching the bag outer panel element 100, 200*a*, 200*b*, 300, 400 to the bag completes the bag). In this way, traditional bag construction is maintained by the invention: the embodiments above augment an existing bag or bag design, rather than replace it with an entirely new bag design.

Preferably outside surfaces of the bag outer panel elements 100, 200*a*, 200*b*, 300, 400 described above are covered with a sheet of clear plastic (e.g. vinyl) film (not shown) comprising a surface texture that matches, or is complimentary to a surface texture on a part of the bag that the bag outer panel element 100 is being attached to. The clear plastic film preferably includes a clear section (positioned at least partially above the optically clear portion) and at least one coloured section (the colour preferably chosen to match a colour to be displayed on the electronic screen 104 204, 304, 404). Optionally the sheet of clear plastic film includes a marginal region fading from the coloured section to the clear section. The clear plastic film may be precoloured, or alternatively painted or printed to as to have the achieve the required coloured and marginal section. These features advantageously disguise the presence of the electronic screen 104 204, 304, 404 on the bag.

Thus, there are a wide range of economic and effective systems in the present invention that allow the display of images that appear to be seamlessly present within a bag outer panel, yet can be altered at will. This permits their use as part of a sponsorship or advertising deal, such that selected images can be displayed at different positions or times during a sports competition or any other commercially desirable conditions.

Figure 7:
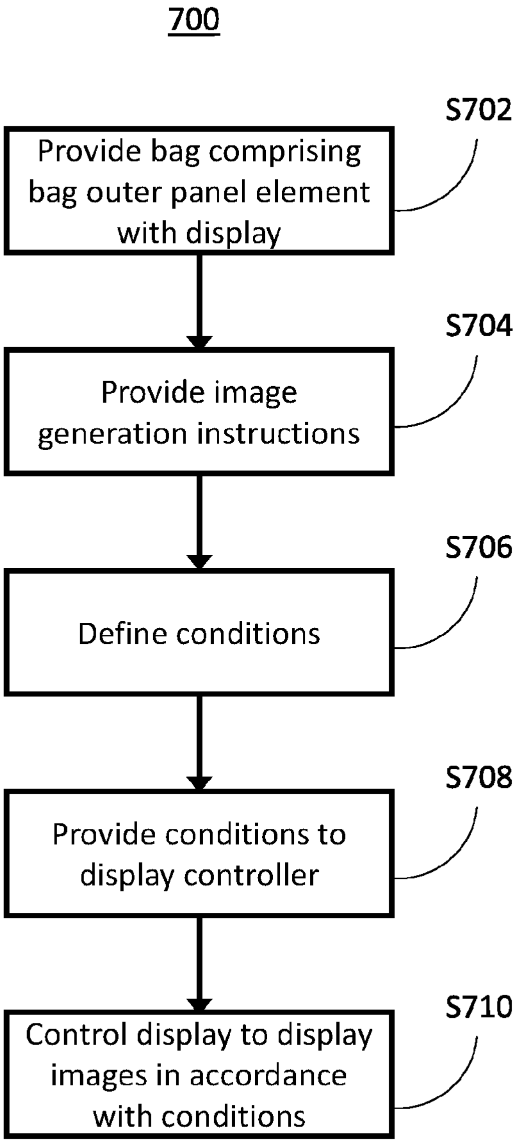
FIG. 7 is a flow diagram of a method of controlling the display of any of the bag outer panel elements shown in FIGS. 1A to 4B.

In one example, the content displayed on the electronic display screen 104, 204, 304, 404, 504, 604 is determined and controlled according to method 700 as shown in FIG. 7. In step S702, a bag outer panel element 100, 200, 300, 400, 500, 600 is provided.

At step S704 one or more instructions for generation of an image (e.g. an advertising image) on the display screen module 103, 203, 403 are provided to the display controller 108, 208, 308, 408. Such instructions include the data required for the display controller 108, 208, 308, 408 to cause the electronic display screen 104, 204, 304, 404, 504, 604 to display the image.

At step S706, one or more conditions under which an image is to be displayed are defined. The one or more conditions optionally include any combination of the following: a specific time, date or period of time; the bag being at a first location, wherein the control means includes a location determining means; and receipt, by the display controller 108, 208, 308, 408, of a signal from an external source (for example an external server or from a local sensor).

At step S708, the defined one or more conditions are then provided to the display controller 108, 208, 308, 408 (for example by storing the one or more conditions at the display controller 108, 208, 308, 408, and/or transmitting the one or more conditions to the control means from an external server, in which case a wireless communications module is preferably provided at the bag outer panel element 100, 200, 300, 400, 500, 600).

It will be appreciated that steps S704, S706 and S708 may be performed in different temporal sequences. For example, rather than send instructions first in step S704, the instructions may be provided to the display controller 108, 208, 308, 408 at the same time as the conditions (i.e. step S706 is performed, then steps S704 and S708 are performed together).

In step S710, the display controller 108, 208, 308, 408 then controls the electronic display screen 104, 204, 304, 404, 504, 604 such that the image is displayed responsive to the display controller detecting that the one or more conditions are satisfied. This optionally involves the display controller 108, 208, 308, 408: detecting that a specific time, date or period of time has been reached (for example corresponding to the time/date/period of time of a sporting event or a particular match, using an internal clock or based on a received signal indicative of time); detecting that the bag is at a first location (for example the bag 50, 60 has arrived at a sports venue, at a press conference area, etc., using an optional location detection module); or receiving a signal from a local/internal sensor (e.g. a motion detection module) or from an external source (e.g. an external server), the signal indicative that the image is to be shown. For instance, advertising time using the bag outer panel element 100, 200, 300, 400, 500, 600 may be sold on a timed basis, and an external server may send a signal to the display controller 108, 208, 308, 408 to display a particular image in accordance with an advertising time slot being sold.

Figure 8:
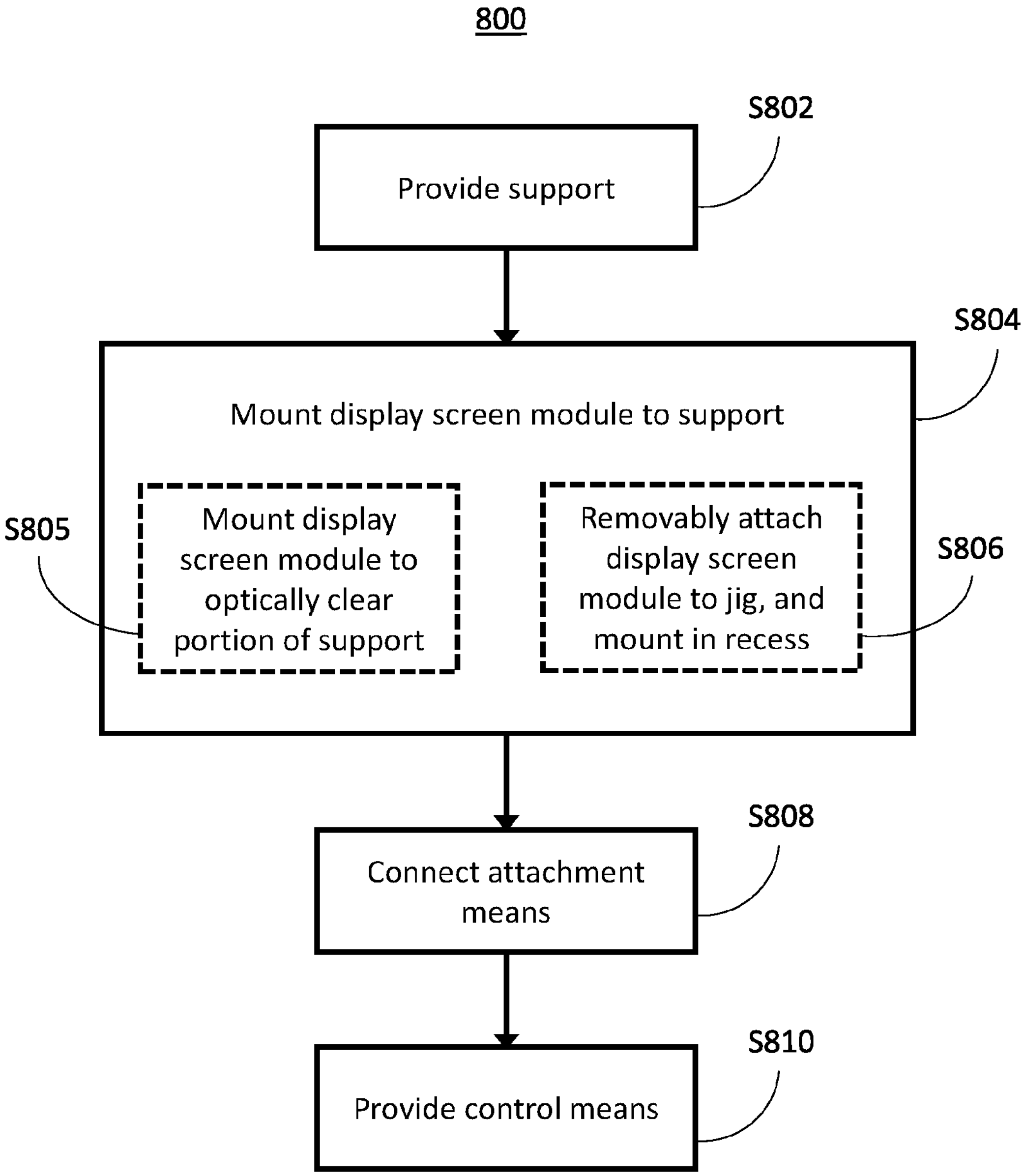
FIG. 8 is a flow diagram of a method of manufacturing a bag outer panel element in accordance with the invention.

FIG. 8 shows an exemplary method of producing a bag outer panel element 100, 200, 300, 400, 500, 600 in accordance with the various embodiments above.

At step S802, a support 102, 202, 302, 402 is provided. The support 102, 202, 302, 402 is optionally preformed to the desired shape or profile, for example by vacuum forming or moulding. Where the support 202 includes an optically clear element 226 (or where the support 202 is entirely optically clear), the support 202 is alternatively affixed to a frame 212, which frame may be preformed such that the support takes on the desired shape or profile when it is affixed to the frame (e.g., the support 202 is bent around the frame 212).

At step S804, a display screen module 103, 203, 403 comprising an electronic display screen 104, 204, 304, 404, 504, 604 is mounted (preferably non-releasably mounted) to the support 102, 202, 302, 402. Depending on the form of the support 102, 202, 302, 402, step S804 may involve different activities.

Where the support 202 includes an optically clear element 226 (or where the support 202 is entirely optically clear), an optically clear adhesive is preferably applied to the support 202 proximate to the optically clear element 226 (or to the display screen module 203). The display screen module 203 is then attached to the optically clear element 226 via the optically clear adhesive, such that the display screen module 203 is optically coupled to, and visible through, the optically clear element 226 (step S805). The optically clear adhesive preferably fills any gap between the display screen module and the optically clear element 226. Optionally, the display screen module 203 is flexed so as to have curvature in at least one plane prior to attaching to the optically clear element 226. Accordingly the method enables effective manufacture a bag outer panel element 200 where the display screen module 203 is positioned beneath a support 202, having good optical properties and a surface profile with complex, e.g. compound curvature.

Where the support 102 includes a recess 128, at step S806 the display screen module 103 is preferably removably attached to an installation jig or frame 14 (either with or without an optically clear element 126 affixed). Optionally, the optically clear element 126 is already attached to, and forms part of, the display module 103 prior to the display module 103 being removably attached to the installation jig in step S806. The installation jig 140 is configured to lie substantially flush with at least a perimeter of an outer surface of the optically clear element 126 (either because the installation jig 140 is flexible, or preformed to the appropriate shape, or both), and the installation jig 140 has outside dimensions 152 greater than corresponding outside dimensions 150 of the display screen module such that the installation jig 140 extends beyond edges of the display screen module 103. Step S806 further comprises affixing the display screen module 103 to the recess 128, e.g. by means on an adhesive, while the electronic display screen 104 is attached to the installation jig 140 (for example by bringing the installation jig 140 into contact with the support 102 such that the installation jig 140 overlaps both the support 102 proximate to the recess 128 and the display screen module 103); and removing the installation jig 140 from the display screen module 103. As shown, the installation jig 140 has a central cut-out, though it will be appreciated that the installation jig 149 may alternatively be continuous, and have a variety of shapes/profiles according to the shape of the support 102 and other components of the bag outer panel element. Advantageously, use of the installation jig 140 enables accurate alignment of components during manufacture, and helps ensure a flush join between the display screen module 103 and the support 102. The method thus provides an effective and accurate means for manufacturing bag outer panel elements 100. Optionally, the installation jig 140 comprises one or more UV radiation sources, and step S806 also comprises: applying UV curable adhesive to at least one of the display module 103 and the recess 128; positioning the electronic display screen 104 within the recess 128; and applying UV radiation to the UV curable adhesive using the one or more UV radiation sources. Advantageously this provides a particularly convenient means for securing the display screen 103 module to the recess 128.

Either before, during or after step S804 (e.g. involving either step S805 or step S806), step S808 is performed, in which an attachment means 116, 216, 316, 416, 516 configured for attachment to a bag outer panel or a bag 50, 60 is connected to the support 102, 202, 302, 402. For example, the attachment means 116, 216, 316, 416, 516 is either connected directly to the support 102, 202, 302, 402, or connected via an intermediate tab 120, 220. The attachment means 116, 216, 316, 416, 516 or tab 120, 220 is optionally attached to the support 102, 202, 302, 402 using adhesive and/or a sewn seam.

Either before, after, or contemporaneously with the steps above, at step S810 a control means (for example a display controller 108, 208, 308, 408) is provided, which is operatively connected or connectable to the display screen module 103, 203, 403. The control means is adapted to control the electronic display screen 104, 204, 304, 404, 504, 604 to display a selected image, for example using the method 700 described in relation to FIG. 7 above.

Additional aspects of manufacturing techniques are described above in relation to FIGS. 1A to 4B.

Whilst the invention has been described with reference to the foregoing specific embodiments, the invention is not limited by the described embodiments. The scope of protection is defined by the appended claims.

Further aspects of the invention will be understood from the following numbered statements.

1. A bag outer panel element, adapted for the external display of controllably selectable images, comprising:
   a support; and
   a display screen module mounted to the support, the display screen module comprising an electronic display screen;
   wherein the support has an attachment means configured for attachment to a bag outer panel or a bag; and
   wherein the display screen module is operatively connected or connectable to control means therefor, said control means being adapted to control the electronic display screen to display a selected image.
2. The bag outer panel element of statement 1 wherein the electronic display screen is a reflective electronic display screen.
3. The bag outer panel element of statement 1 or statement 2 comprising an outer surface; wherein the outer surface is shaped so as to continue a profile of a surface of the bag outer panel.
4. The bag outer panel element of any preceding statement, wherein the support comprises an optically clear element;
   wherein the display screen module is mounted to the optically clear element so as to be visible through, and optically coupled to, the optically clear portion.
5. The bag outer panel element of statement 4, wherein the optically clear element is shaped so as to continue a profile of a surface of the bag outer panel.
6. The bag outer panel element of statement 4 or statement 5, wherein the optically clear element is a portion of the support.
7. The bag outer panel element of any of statements 1 to 5, wherein the support has a recess formed therein, wherein the display screen module is held conformably within the recess.
8. The bag outer panel element of any preceding statement, wherein the electronic display screen is a flexible electronic display screen, and is mounted to the support such that the flexible electronic display screen has curvature in at least a first plane.
9. The bag outer panel element of statement 8 when dependent on statement 4, wherein an outer surface of the optically clear element has curvature in at least the first plane and a second plane.
10. The bag outer panel element of any preceding statement, wherein the attachment means comprises one or more of:
   a plurality of holes for receiving a thread;
   a fastener configured to interact with a corresponding fastener on the bag outer panel;
   an adhesive.
11. The bag outer panel element of any preceding statement, wherein the support comprises a lip portion, the lip portion extending from at least part of a periphery of the support and extending substantially towards an interior of a bag in use;
   wherein the lip portion comprises the attachment means; or
   wherein a tab is secured to the lip portion, and the tab comprises the attachment means.
12. A bag comprising the bag outer panel element of any preceding statement.
13. A method of displaying images on a bag, the method comprising:
   providing the bag of statement 12;
   providing, to the control means, one or more instructions for generation of an image on the display screen module;
   defining one or more conditions under which an image is to be displayed;
   providing the defined one or more conditions to the control means;
   controlling, with the control means, the electronic display such that the image is displayed responsive to the control means detecting that the one or more conditions are satisfied.
14. The method of statement 13 wherein the one or more conditions include one or more of:
   a specific time, date or period of time;
   the bag being at a first location, wherein the control means includes a location determining means; and
   receipt, by the control means, of a signal from an external source.
15. A method for producing a bag outer panel element, the method comprising:
   providing a support;
   mounting a display screen module to the support, the display screen module comprising an electronic display screen;
   connecting an attachment means to the support, the attachment means configured for attachment to a bag outer panel or a bag; and
   providing a control means operatively connected or connectable to the display screen module, said control means being adapted to control the electronic display screen to display a selected image.
16. The method of statement 15, wherein:
   providing the support comprises shaping the support and providing an optically clear portion in the support; and
   mounting the display screen module to the support comprises applying an optically clear adhesive to the support proximate to the optically clear portion, and applying the display screen module to the optically clear adhesive, such that the display screen module is optically coupled to, and visible through, the optically clear portion.
17. The method of statement 15, wherein:
   providing the support comprises shaping the support so as to include a recess;
   mounting the display screen module to the support comprises:
      removably attaching the display screen module to an installation jig, wherein the installation jig is configured to lie substantially flush with at least a perimeter of an outer surface of the optically clear portion, and the installation jig has outside dimensions greater than corresponding outside dimensions of the display screen module such that the installation jig extends beyond edges of the display screen module;

affixing the display screen module to the recess while the display screen is attached to the installation jig;

removing the installation jig from the display screen module.

18. The method of statement 17, wherein the optically clear portion is attached to, and forms part of, the display module prior to the display module being removably attached to the installation jig.

19. The method of statement 16 or statement 18, wherein the installation jig comprises one or more UV radiation sources, and wherein affixing the display screen module to the recess while the display screen is attached to the installation jig comprises:

applying UV curable adhesive to at least one of the display module and the recess;

positioning the display screen within the recess; and applying UV radiation to the UV curable adhesive using the one or more UV radiation sources.

What is claimed is:

1. A bag outer panel element, adapted for external display of controllably selectable images, comprising:

an optically clear support; and a display screen module non-releasably mounted to the support, the display screen module comprising an electronic display screen;

wherein the electronic display screen is optically coupled to the support such that a gap between the electronic display screen and the support is substantially filled with a non-gaseous intermediate optically clear medium;

wherein the support has an attachment means configured for attachment to a bag outer panel or a bag; and wherein the display screen module is operatively connected or connectable to control means therefor, said control means being adapted to control the electronic display screen to display a selected image.

2. The bag outer panel element of claim 1, wherein the intermediate optically clear medium comprises one or more of:

an optically clear adhesive; and an optically clear filler.

3. The bag outer panel element of claim 1, wherein:

the intermediate optically clear medium has a first refractive index;

the support has a second refractive index; and the first refractive index substantially matches the second refractive index.

4. The bag outer panel element of claim 1, further comprising a frame affixed to the support, wherein the frame has a stiffness greater than or equal to a stiffness of the support.

5. The bag outer panel element of claim 4, wherein;

the frame comprises the attachment means; or a tab is secured to the frame, and the tab comprises the attachment means.

6. The bag outer panel element of claim 1, wherein the support comprises a lip portion, the lip portion extending from at least part of a periphery of the support and extending substantially at an angle with respect to an outer surface of the bag outer panel element and towards an interior of a bag in use;

wherein the lip portion comprises the attachment means; or wherein a tab is secured to the lip portion, and the tab comprises the attachment means.

7. The bag outer panel element of claim 1, wherein the support comprises a flexible plastics material, and wherein:

the non-gaseous intermediate optically clear medium comprises an optically clear plastics layer disposed in the gap between the electronic display and the support; and the optically clear plastics layer has a stiffness greater than a stiffness of the support and less than a stiffness of the electronic display.

8. The bag outer panel element of claim 1, wherein the electronic display screen is a reflective electronic display screen.

9. The bag outer panel element of claim 1 comprising an outer surface; wherein the outer surface is shaped so as to continue a profile of a surface of the bag outer panel.

10. The bag outer panel element of claim 1, wherein the support is shaped so as to continue a profile of a surface of the bag outer panel.

11. The bag outer panel element of claim 1, wherein the electronic display screen is a flexible electronic display screen, and is mounted to the support such that the flexible electronic display screen has curvature in at least a first plane.

12. The bag outer panel element of claim 11, wherein an outer surface of the support has curvature in at least the first plane and a second plane.

13. The bag outer panel element of claim 1, wherein the attachment means comprises one or more of:

a plurality of holes for receiving a thread;

a fastener configured to interact with a corresponding fastener on the bag outer panel;

an adhesive.

14. A bag comprising the bag outer panel element of claim 1.

15. A method of displaying images on a bag, the method comprising:

providing the bag of claim 14;

providing, to the control means, one or more instructions for generation of an image on the display screen module;

defining one or more conditions under which an image is to be displayed;

providing the defined one or more conditions to the control means;

controlling, with the control means, the electronic display screen such that the image is displayed responsive to the control means detecting that the one or more conditions are satisfied.

16. The method of claim 15, wherein the one or more conditions include one or more of:

a specific time, date or period of time;

the bag being at a first location, wherein the control means includes a location determining means; and receipt, by the control means, of a signal from an external source.

17. A bag outer panel element, adapted for the external display of controllably selectable images, comprising:

a support having a recess formed therein;

an optically clear element; and a display screen module non-releasably mounted to the support, the display screen module comprising an electronic display screen, wherein the display screen module is held conformably within the recess;

wherein the electronic display screen is optically coupled to the optically clear element such that a gap between the electronic display screen and the optically clear element is substantially filled with a non-gaseous intermediate optically clear medium;

wherein the support has an attachment means configured for attachment to a bag outer panel or a bag; and wherein the display screen module is operatively connected or connectable to control means therefor, said control means being adapted to control the electronic display screen to display a selected image.

18. The bag outer panel element of claim 17, wherein the intermediate optically clear medium comprises one or more of:

an optically clear adhesive; and an optically clear filler.

19. The bag outer panel element of claim 17, wherein:

the intermediate optically clear medium has a first refractive index;

the optically clear element has a second refractive index; and first refractive index substantially matches the second refractive index.

20. The bag outer panel element of claim 17 wherein the electronic display screen is a reflective electronic display screen.

21. The bag outer panel element of claim 17 comprising an outer surface; wherein the outer surface is shaped so as to continue a profile of a surface of the bag outer panel.

22. The bag outer panel element of claim 17, wherein the optically clear element is shaped so as to continue a profile of a surface of the bag outer panel.

23. The bag outer panel element of claim 17, wherein an optically clear portion extends beyond a periphery of the display screen module and is fixed to the support, such that the display screen module is held between the recess and the optically clear portion.

24. The bag outer panel element of claim 17, wherein the electronic display screen is a flexible electronic display screen, and is mounted to the support such that the flexible electronic display screen has curvature in at least a first plane.

25. The bag outer panel element of claim 24, wherein an outer surface of the optically clear element has curvature in at least the first plane and a second plane.

26. The bag outer panel element of claim 17, wherein the attachment means comprises one or more of:

a plurality of holes for receiving a thread;

a fastener configured to interact with a corresponding fastener on the bag outer panel;

an adhesive.

27. The bag outer panel element of claim 17, wherein the support comprises a lip portion, the lip portion extending from at least part of a periphery of the support and extending substantially at an angle with respect to an outer surface of the bag outer panel element and towards an interior of a bag in use;

wherein the lip portion comprises the attachment means; or wherein a tab is secured to the lip portion, and the tab comprises the attachment means.

28. The bag outer panel element of claim 17, further comprising a frame affixed to the support, wherein the frame has a stiffness greater than a stiffness of the support.

29. The bag outer panel element of claim 28, wherein:

the frame comprises the attachment means; or a tab is secured to the frame, and the tab comprises the attachment means.

30. A method for producing a bag outer panel element, the method comprising:

providing an optically clear support;

affixing the optically clear support to a frame;

non-releasably securing a display screen module to the support, the display screen module comprising an electronic display screen, such that the electronic display screen is optically coupled to the support, such that a gap between the electronic display screen and the support is substantially filled with a non-gaseous intermediate optically clear medium;

connecting an attachment means to the optically clear support, the attachment means configured for attachment to a bag outer panel or a bag; and providing a control means operatively connected or connectable to the display screen module, said control means being adapted to control the electronic display screen to display a selected image.

31. The method of claim 30, wherein:

the intermediate optically clear medium comprises an optically clear adhesive; and mounting the display screen module to the support comprises applying the optically clear adhesive to the support proximate to the support, and applying the display screen module to the optically clear adhesive, such that the display screen module is optically coupled to, and visible through, the support; or mounting the display screen module to the support comprises applying the optically clear adhesive to the display screen module, and applying the support proximate to the optically clear portion to the optically clear adhesive, such that the display screen module is optically coupled to, and visible through, the optically clear portion.

32. The method of claim 30, wherein:

providing the support comprises shaping the support to a pre-defined profile prior to affixing the support to the frame; or the frame has a pre-formed shape, such that affixing the support to the frame causes the support to take on the predefined profile.

33. A method for producing a bag outer panel element, the method comprising:

providing a support comprising a recess;

providing an optically clear element;

mounting a display screen module into the recess of the support, the display screen module comprising an electronic display screen, such that the electronic display screen is optically coupled to the optically clear element, such that a gap between the electronic display screen and the optically clear element is substantially filled with a non-gaseous intermediate optically clear medium;

connecting an attachment means to the support, the attachment means configured for attachment to a bag outer panel or a bag; and providing a control means operatively connected or connectable to the display screen module, said control means being adapted to control the electronic display screen to display a selected image.

34. The method of claim 33, wherein mounting the display screen module to the support comprises:

removably attaching the display screen module to an installation jig, wherein the installation jig is configured to lie substantially flush with at least a perimeter of an outer surface of the optically clear element, and the installation jig has outside dimensions greater than corresponding outside dimensions of the display screen module such that the installation jig extends beyond edges of the display screen module;

affixing the display screen module to the recess while the display screen is attached to the installation jig;

removing the installation jig from the display screen module.

35. The method of claim 34, wherein the optically clear portion is attached to, and forms part of, the display screen module prior to the display module being removably attached to the installation jig.

36. The method of claim 33, wherein the installation jig comprises one or more UV radiation sources, and wherein affixing the display screen module to the recess while the display screen is attached to the installation jig comprises:

applying UV curable adhesive to at least one of the display module and the recess;

positioning the display screen within the recess; and applying UV radiation to the UV curable adhesive using the one or more UV radiation sources.

* * * * *